United States Patent
Jachmann et al.

(10) Patent No.: US 11,435,496 B2
(45) Date of Patent: Sep. 6, 2022

(54) REDUCING DATA BANDWIDTH REQUIREMENTS IN DOWNHOLE NUCLEAR MAGNETIC RESONANCE PROCESSING

(71) Applicant: Halliburton Energy Services, Inc., Houston, TX (US)

(72) Inventors: Rebecca Corina Jachmann, Spring, TX (US); Jie Yang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 98 days.

(21) Appl. No.: 16/595,022

(22) Filed: Oct. 7, 2019

(65) Prior Publication Data

US 2021/0103071 A1 Apr. 8, 2021

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC .................................. G01V 3/32; G01V 3/38
See application file for complete search history.

(56) References Cited

U.S. PATENT DOCUMENTS

| | | | |
|---|---|---|---|
| 5,291,137 A * | 3/1994 | Freedman | G01V 3/32 324/303 |
| 6,518,756 B1 | 2/2003 | Morys et al. | |
| 6,566,874 B1 | 5/2003 | Speier et al. | |
| 7,196,516 B2 | 3/2007 | Blanz et al. | |
| 7,268,547 B2 | 9/2007 | Kruspe et al. | |
| 9,562,989 B2 | 2/2017 | Conrad et al. | |
| 9,784,881 B2 | 10/2017 | Jachmann et al. | |
| 10,126,457 B2 | 11/2018 | Coman et al. | |
| 10,168,444 B2 | 1/2019 | Jachmann et al. | |
| 2004/0032258 A1 | 2/2004 | Blumich | |

(Continued)

FOREIGN PATENT DOCUMENTS

| | | |
|---|---|---|
| WO | 2006023346 A1 | 3/2006 |
| WO | 2012170014 A1 | 12/2012 |

OTHER PUBLICATIONS

PCT Application Serial No. PCT/US2019/055073, International Search Report, dated Jul. 6, 2020, 4 pages.

(Continued)

*Primary Examiner* — Susan S Lee
(74) *Attorney, Agent, or Firm* — DeLizio, Peacock, Lewin & Guerra

(57) ABSTRACT

Echo signals are acquired from operation of a nuclear magnetic resonance logging (NMR) tool in a borehole. A multi-inversion process is performed on the echo signals. The multi-inversion process includes a downhole processor performing a downhole inversion. The multi-inversion process includes reconstructing echoes from coefficients in the downhole inversion. Reconstructing echoes is performed by one of the downhole processor or an uphole processor. The multi-inversion process includes transmitting one of: (a) the coefficients in the downhole inversion or (b) the reconstructed echoes to the uphole processor. The multi-inversion process includes the uphole processor performing an uphole inversion on the reconstructed echoes to produce final coefficients used in a spectrum.

20 Claims, 19 Drawing Sheets

(56) References Cited

U.S. PATENT DOCUMENTS

| | | | |
|---|---|---|---|
| 2006/0273787 A1 | 12/2006 | Blanz | |
| 2007/0096732 A1* | 5/2007 | Samsonov | G01R 33/5611 |
| | | | 324/309 |
| 2008/0036457 A1 | 2/2008 | Thern et al. | |
| 2009/0192711 A1* | 7/2009 | Tang | E21B 47/12 |
| | | | 702/6 |
| 2009/0292473 A1 | 11/2009 | Kruspe et al. | |
| 2010/0010744 A1 | 1/2010 | Prange et al. | |
| 2012/0025820 A1 | 2/2012 | Minh et al. | |
| 2016/0018555 A1 | 1/2016 | Jachmann et al. | |
| 2016/0170066 A1* | 6/2016 | Heaton | G01V 11/002 |
| | | | 324/303 |
| 2018/0003852 A1 | 1/2018 | Jachmann et al. | |
| 2018/0164465 A1* | 6/2018 | Chen, IV | G01V 3/38 |

OTHER PUBLICATIONS

PCT Application Serial No. PCT/US2019/055073, International Written Opinion, dated Jul. 6, 2020, 7 pages.

* cited by examiner

T1 Uphole Inversion

T1 OR

REDUCING DATA BANDWIDTH REQUIREMENTS IN DOWNHOLE NUCLEAR MAGNETIC RESONANCE PROCESSING

BACKGROUND

Nuclear magnetic resonance (NMR) has two main experiments in oil field downhole usage. The first experiment is to assess $T_1$ buildup of magnetization. The second experiment is to observe the decay of magnetization once it has been excited, in which the decay has a time constant of $T_2$.

Measurement of $T_1$ is indirect and is done by varying the polarization times after magnetization has, through some means, been nullified or inverted. For downhole observation, a NMR measurement technique, designed by Carr, Purcell, Meiboom, and Gill and, hence, referred to as CPMG, is used. It is considered a $T_2$ measurement. CPMG has an excitation pulse followed by several refocusing pulses to counter the magnetic gradients in downhole NMR systems.

A $T_1$ sequence is typically done as: NullPulse—Wait-Time—Excitation Pulse—Recover pulses.

Typically, the sequence has several different wait times. The number of recovery pulses may be as few as 3 and as many as the electronics can handle. Typically, the number of recovery pulses is less than 2000.

Further, in NMR while drilling or logging, the magnetization in a magnetic field is constantly working to align itself towards the magnetic field. The magnitude at which the magnetization does this is proportional to the magnetic field. However, as in any system that gets perturbed, it takes time to get to an equilibrium state. The rate at which the equilibrium is achieved is described by the time constant $T_1$, mentioned above.

When the NMR tool is moving, the magnetization produced by a field generated by a magnet within the NMR tool is constantly experiencing a shift from equilibrium. When the NMR tool is moving fast enough, the magnetization effectively picks up magnetic memory. The magnetization's profile is similar to that of the magnetic field but is lagging behind.

Executing the NMR experiments downhole on a moving NMR tool is a challenge. Processing the data from a moving tool downhole can lead to compromised data.

The vast amount of data the NMR tool produces is not easily transferrable to the surface. Instead, typically, the data processing result of an inversion, spectral coefficients, is sent to the surface instead.

However, even sending the spectra at a good resolution can be a challenge. Typically, in drilling environments, the bandwidth at which data can be transmitted from a downhole NMR tool to an uphole location, such as the surface, is slow and is prudently managed. One new method is presented which can both send data up more efficiently and process motion data correctly.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
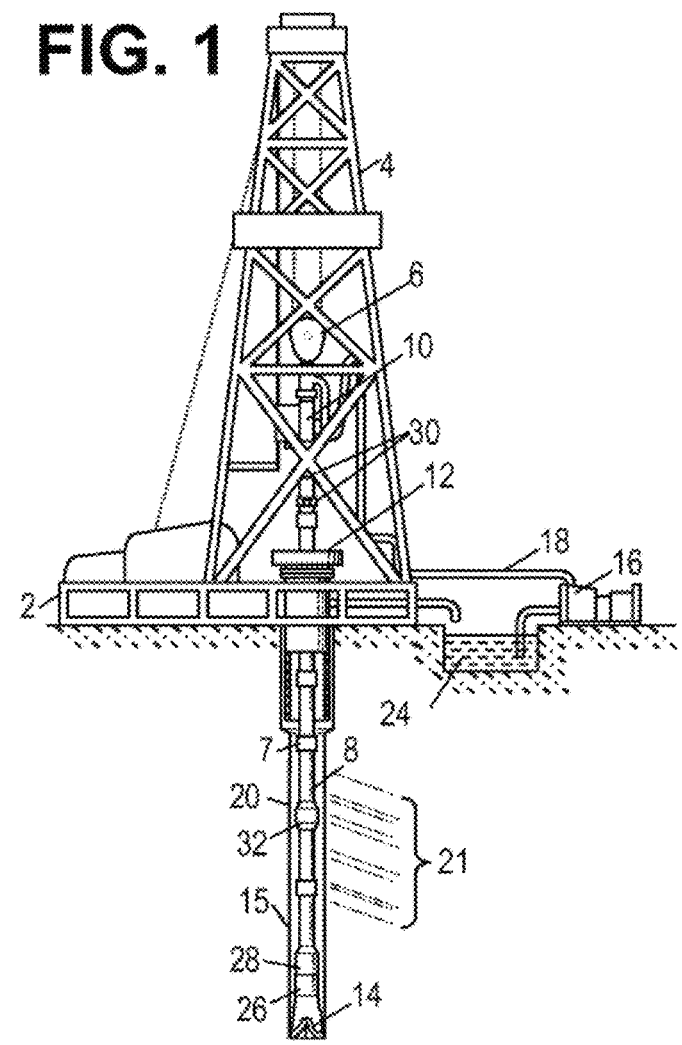
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A top drive 10 supports and rotates the drill string 8 as the string is lowered through a well head 12. The drill string's rotation (and/or a downhole motor) drives a drill bit 14 to extend the borehole 15 through subsurface earth formations 21. As the drill string is extended into the borehole additional sections may be attached to the drill string using couplers, such as coupler to increase the overall length of the drill string. Mud recirculation equipment 16 draws drilling fluid from a retention pit 24 and pumps it through a feed pipe 18 to top drive 10, through the interior of drill string 8 to the drill bit 14, through orifices in the drill bit, through the annulus formed between a borehole wall 20 and around drill string 8 to a blowout preventer at the surface, and through a discharge pipe into the pit 24. The drilling fluid transports cuttings from the borehole into the pit 24 and aids in maintaining the borehole integrity.

A nuclear magnetic resonance (NMR) logging tool 26 is integrated into the bottom-hole assembly near the bit 14. The NMR logging tool 26 may take the form of a drill collar, i.e., a thick-walled tubular that provides weight and rigidity to aid the drilling process. As the bit extends the borehole through the formations, the NMR logging tool collects measurements relating to spin relaxation time ($T_1$, $T_2$, $T_p$, and/or $T_2^*$) distributions as a function of depth or position in the borehole. The NMR tool has a magnet, antenna, and supporting electronics. The permanent magnet in the tool causes the nuclear spins to build up into a cohesive magnetization. The $T_2$ is measured through the decay of excited magnetization while $T_1$ is measured by the buildup of magnetization. Other tools and sensors can also be included in the bottomhole assembly to gather measurements of various drilling parameters such as position, orientation, weight-on-bit, borehole diameter, etc. Control/telemetry module 28 collects data from the various bottomhole assembly instruments (including position and orientation information) and stores them in internal memory, which may be able to store hundreds of hours of data. Selected portions of the data (raw or processed) can be communicated to surface receivers 30 by, e.g., mud pulse telemetry. Other logging-while drilling telemetry methods also exist and could be employed. For example, electromagnetic telemetry or through-wall acoustic telemetry can be employed with an optional repeater 32 to extend the telemetry range. Most telemetry systems also enable commands to be communicated from the surface to the control and telemetry module to configure the operation of the tools.

Figure 2:
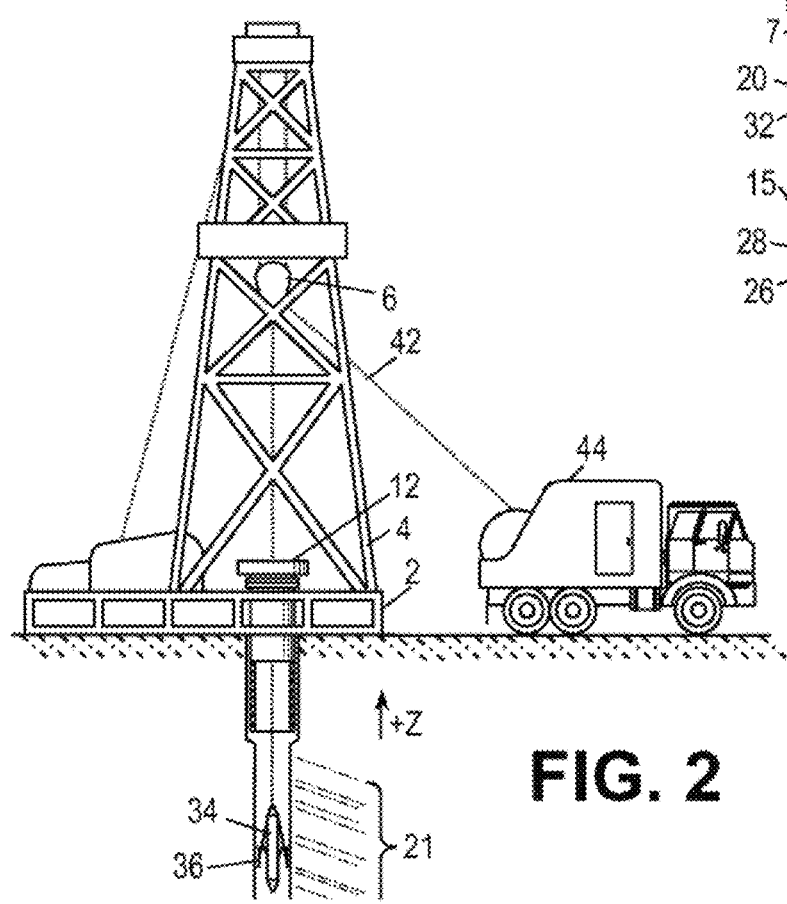
FIG. 2 shows an illustrative wireline logging environment.

FIG. 2 shows an illustrative wireline logging environment. At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. The wireline logging tool 34 may have pads 36 and/or centralizing springs or a decentralizer to maintain the tool in the right position, for example, that could be near the axis of the borehole or against wall, as the tool is pulled uphole. As explained further below, tool 34 can include an NMR logging instrument that collects relaxation time distribution measurements. A logging facility 44 collects measurements from the logging tool 34 and includes a computer system for processing and storing the measurements gathered by the logging tool.

Figure 3:
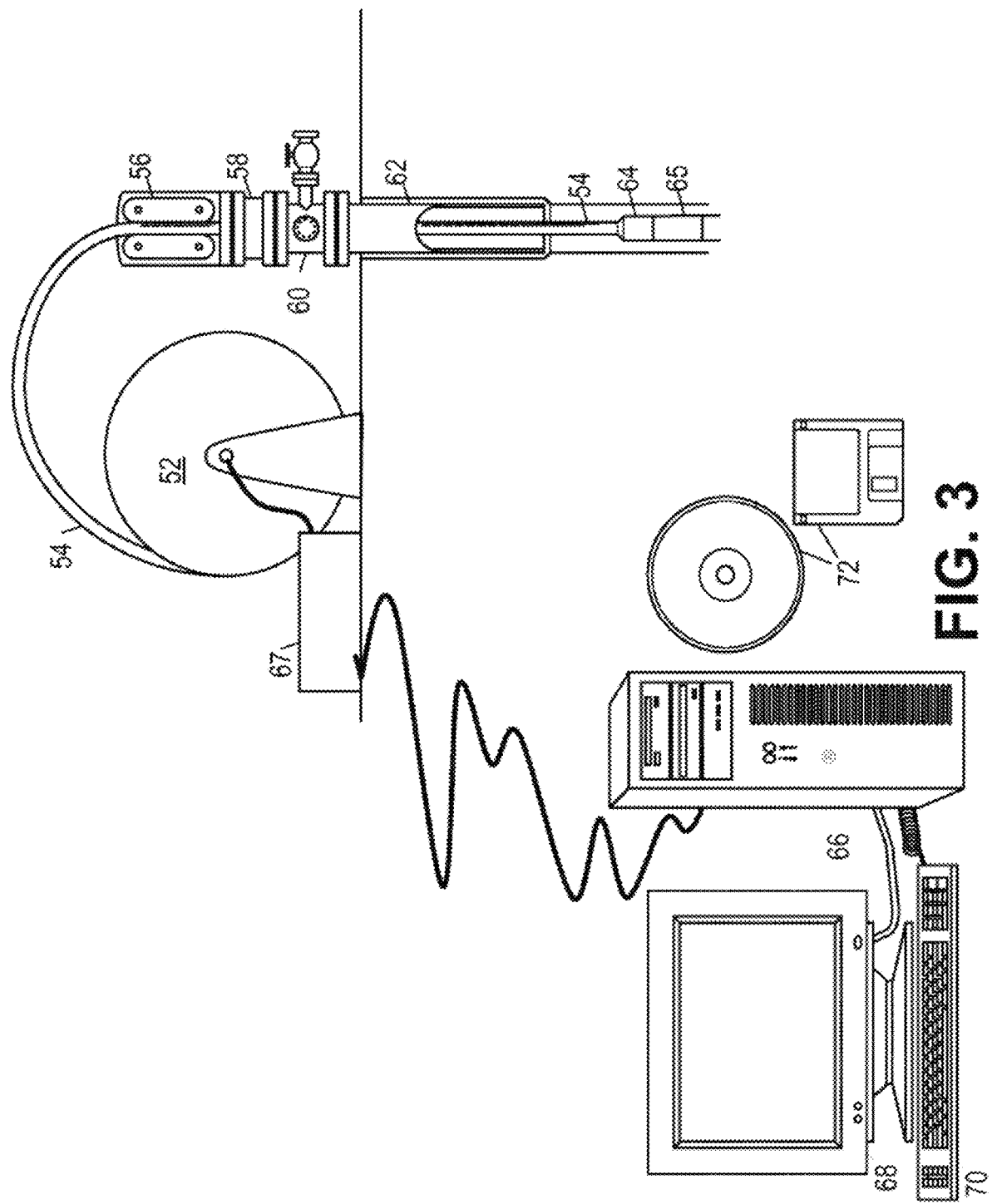
FIG. 3 shows an illustrative coil tubing logging system.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well, a supervisory sub 64 and one or more logging tools 65 are coupled to the coil tubing 54 and configured to communicate to a surface computer system 66 via information conduits or other telemetry channels. An uphole interface 67 may be provided to exchange communications with the supervisory sub and receive data, to be conveyed to the surface computer system 66.

Surface computer system 66 is configured to communicate with supervisory sub 64 to set logging parameters and collect logging information from the one or more logging tools 65 such as an NMR logging tool. Surface computer system 66 is preferably configured by software (shown in FIG. 3 in the form of removable storage media 72) to monitor and control downhole instruments 64, 65. System 66 includes a display device 68 and a user-input device 70 to enable a human operator to interact with the system control software 72.

In each of the foregoing logging environments, the logging tool assemblies preferably include a navigational sensor package that includes direction sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) or angle from the high side of the wellbore. In accordance with known techniques, wellbore directional measurements can be made as follows: a three-axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the bottom hole assembly can be determined. Additionally, a three-axis magnetometer measures the earth's magnetic field vector in a similar manner. Or gyro sensors can be used to measure angular velocity. From the combined gyro, magnetometer and accelerometer data, the horizontal angle of the bottom hole assembly may be determined. A motion sensing unit can also be included to track the position of the tool. In many cases, the motion sensing unit can derive the position information from the direction sensors.

Figure 4:
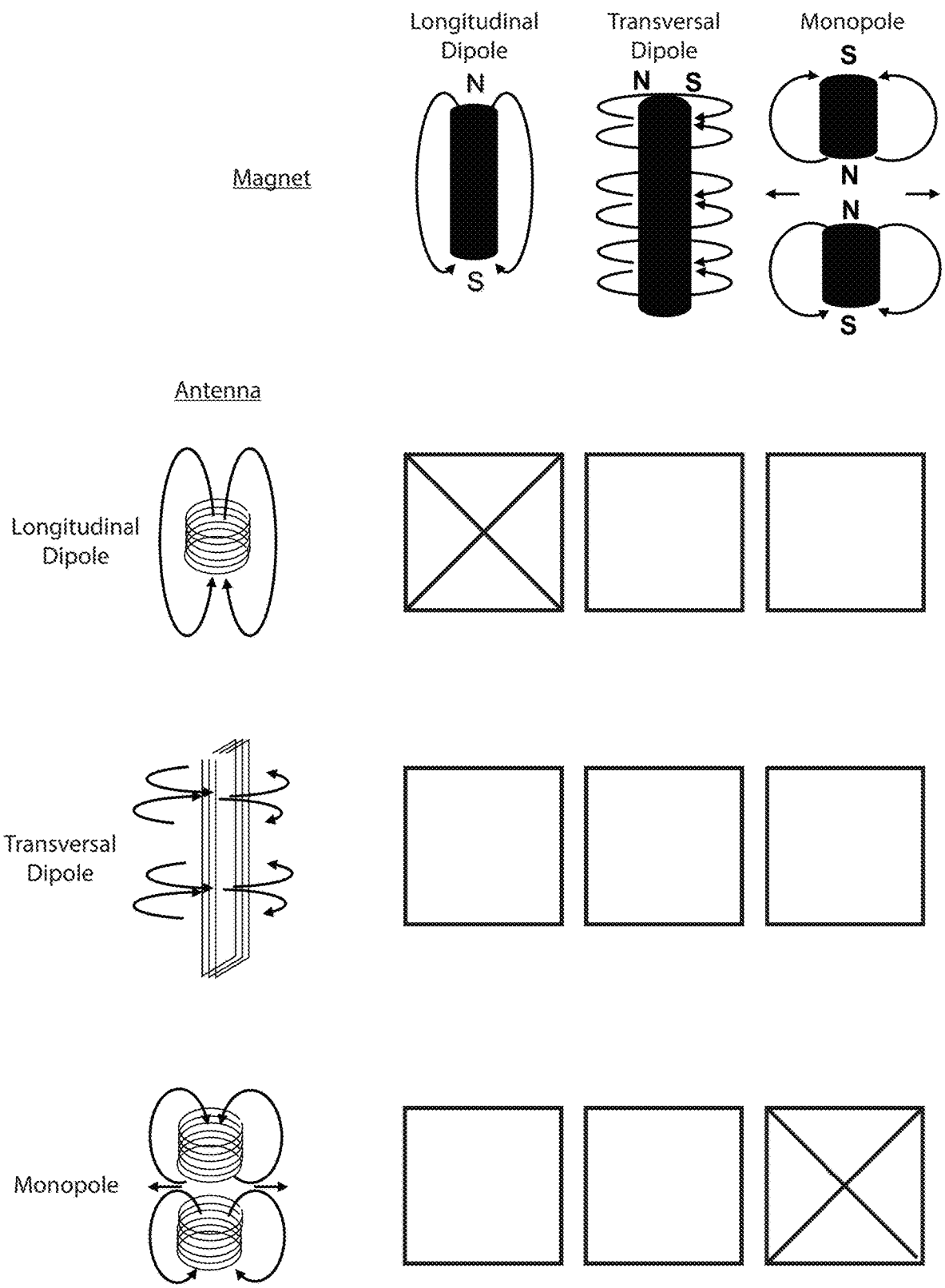
FIG. 4 shows views of illustrative magnet and antenna arrangements for all NMR tool designs.

FIG. 4 shows views of illustrative magnet and antenna arrangements for NMR tool designs. There are many elaborate magnet schemes to create the static magnetic field for down hole logging. The building blocks for all of these schemes are the basic available magnetic field dimensional possibilities, as shown in FIG. 4: longitudinal dipole, transversal dipole, and monopole. These three building blocks can be used for the antenna and the magnet. Different combinations of these basic fields will create different sensitivities to the signal. The creation of shaped static magnetic fields, $B_0$ and the associated antenna field, $B_1$ which is best suited for an NMR experiment, is different depending on the intended application for the NMR tool. For instance, for a drilling environment, axial symmetric or nearly axial symmetric magnet field designs are considered preferable. The creation of these magnet fields may include a magnet which is composed of many pieces of magnet. The direction of those magnets may vary from axial to transversal, or even in a monopole direction, where the direction of the material is radial outward, or a combination thereof. The magnet maybe created using magnet sections grouped together and placed at carefully designed spacings to get the desired magnetic field shape. Magnets in opposing magnetic direction to the other magnets in the main configuration maybe placed to stretch, weaken, change the gradient, or shape the field. The magnet and antenna fields maybe be created also with the addition of magnetically permeable material. The location of the magnetic permeable material is not limited to under the antenna, where being "under the antenna" means closer to the center of the tool radially than the antenna, but in most configurations, there will be some magnetically permeable material under the antenna. The antenna may be placed directly adjacent to the permeable magnetic material or have a specific spacing between the antenna and the material.

Magnet/antenna configurations may be created that have more than one sensitive volume. The sensitive volume is the volume from which NMR signal will be observed. Magnet/antenna configurations may be created that use more than one antenna. The additional antenna may be used to collect data from the more than one volumes. However, in some cases a second antenna will collect data from the same sensitive volume. A third antenna might even be used to collect data from the same sensitive volume for select combinations. In the case where more than one antenna collects data from the same sensitive volume it is best if those antennas are orthogonal.

Combinations like monopole magnet with longitudinal dipole antenna, transversal dipole magnet with transversal dipole antenna, and longitudinal dipole magnet with transversal dipole create round enough magnetic fields to be used in a downhole drilling environment, as indicated in a combination matrix shown in FIG. 4. The only combinations which are not used because the signal will be practically zero are longitudinal dipole magnets with longitudinal dipole antennas and monopole magnets with monopole antennas, as indicated by X's in the combination matrix.

Figure 5A:
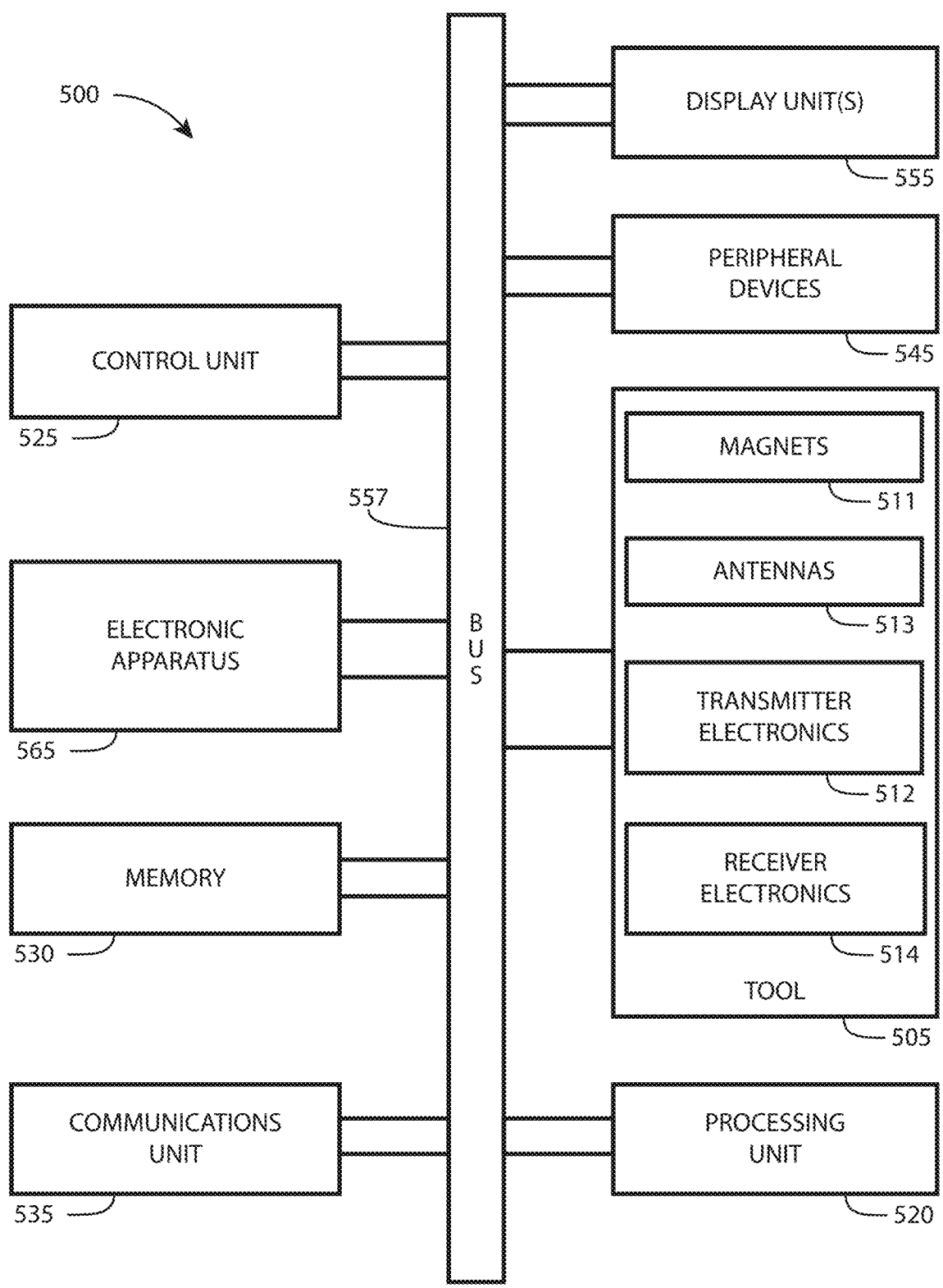
FIG. 5A is a block diagram of features of an example embodiment of a system operable to process nuclear magnetic resonance data and prepare for sending uphole.

FIG. 5A is a block diagram of features of an example embodiment of a system operable to process nuclear magnetic resonance data which is less demanding to send uphole from an NMR logging tool 505, as described herein or in a similar manner. The system 500 can include the NMR tool 505 having an arrangement of magnets 511, antenna(s) 513, transmitter electronics 512, and receiver electronics 514. The system 500 can be configured to operate in accordance with the teachings herein.

The system 500 can include a control unit 525, a memory 530, an electronic apparatus 565, and a communications unit 535. The memory 530 can be structured to include a database. The control unit 525, the memory 530, and the communications unit 535 can be arranged to operate as a processing unit to control operation of the transmitter electronics 512 and the receiver electronics 514 and to perform operations on the signals collected by the receiver electronics 514 to process nuclear magnetic resonance data generated by the NMR logging tool 505. A processing unit 520, structured to process nuclear magnetic resonance data of the NMR logging tool 505, can be implemented as a single unit or distributed among the components of the system 500 including electronic apparatus 565. The control unit 525 and the memory 530 can operate to control activation of the transmitter electronics 512 to generate echo train sequences and recovery pulses. The control unit 525 and the memory 530 can operate to control selection of the receiver electronics 514 in the tool 505 and to manage processing schemes. The control unit 525, the memory 530, and other components of the system 500 can be structured, for example, to operate similar to or identical to the components discussed herein or similar to or identical to any of methods discussed herein.

The system 500 can also include a bus 557, where the bus 557 provides electrical conductivity among the components of the system 500. The bus 557 can include an address bus, a data bus, and a control bus, each independently configured or in an integrated format. The bus 557 can be realized using a number of different communication mediums that allows for the distribution of components of the system 500. Use of the bus 557 can be regulated by the control unit 525. Bus 557 can include a communications network.

In various embodiments, the peripheral devices 545 can include additional storage memory and other control devices that may operate in conjunction with the control unit 525 and the memory 530. In an embodiment, the control unit 525 can be realized as a processor or a group of processors that may operate independently depending on an assigned function. The system 500 can include display unit(s) 555, which can be used with instructions stored in the memory 530 to implement a user interface to monitor the operation of the tool 505 or components distributed within the system 500.

The components shown in FIG. 5A need not be distributed as shown. Some of the components may be located on the surface, some in the tool 505, some in other locations in the drill string 8, wireline logging tool 34, logging tools 65, or some other location in the systems illustrated in FIGS. 1, 2, and 3, and some may be distributed among those locations.

Figure 5B:
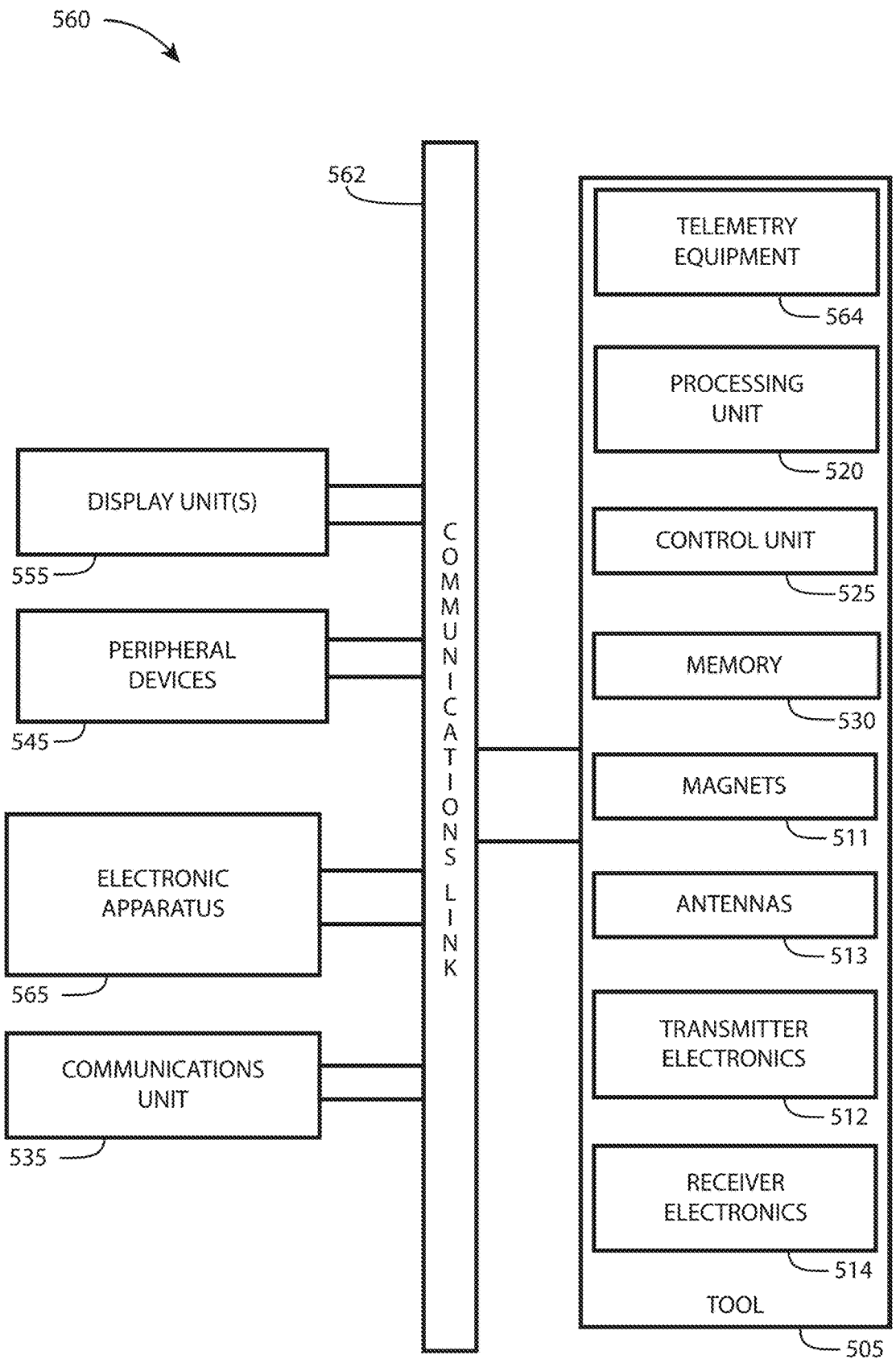
FIG. 5B is a block diagram of features of an example embodiment of a system operable to process nuclear magnetic resonance data.

FIG. 5B is block diagram of features of another example embodiment of a system operable to process nuclear magnetic resonance data of an NMR logging tool, as described herein or in a similar manner. In the system 560 illustrated in FIG. 5B, the processing unit 520, the control unit 525, and the memory 530 are located in the tool 505. The components in the tool 505 communicate via a communications link 562 using telemetry equipment 564 to communicate with, for example, the communications unit 535.

Figure 6:
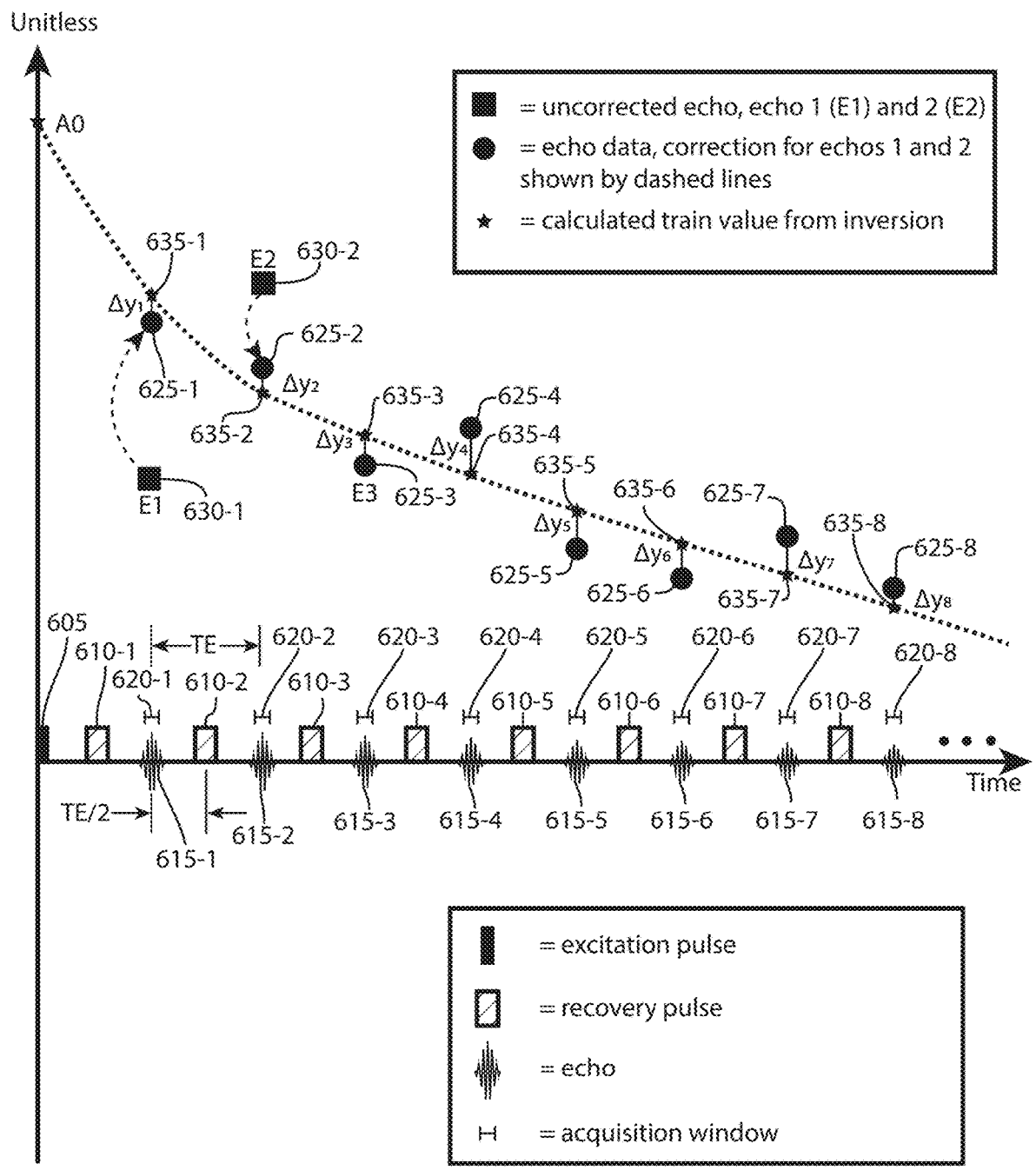
FIG. 6 is a representation of a CPMG sequence.

FIG. 6 is a representation of a CPMG sequence. FIG. 6 illustrates an excitation pulse 605 and a sequence of recovery pulses 610-1, 610-2, . . . , 610-8. In this non-limiting example sequence, eight recovery pulses 610-1, 610-2, . . . , 610-8 cause eight echoes 615-1, 615-2, . . . , 615-8, where the peak amplitudes of the echoes are equally spaced apart by a peak to peak time distance, TE (echo time), that corresponds to the equally spaced apart time distances of the recovery pulses. Recovery pulses are not limited to eight pulses, but the number used may depend on the application and/or measurement parameters. Also indicated are acquisition windows 620-1, 620-2, . . . , 620-8 for capturing the signal of an echo, a first echo $E_1$, a second echo $E_2$, and a third echo $E_3$. A0 is the amplitude of the echo train at time zero. A0 is not measured but is calculated by using an exponential decay fitting curve determined from the third echo $E_3$ to the last echo. $E_1$ and $E_2$ can be included if they are corrected. These echoes decay according to the $T_2$ of the medium. Magnetization will be allowed to recover fully or partially for the next sequence, then a medium can be probed again by another sequence.

A $T_1$ experiment downhole consists of a flipping or nulling of the magnetization in the positive z direction through an inversion, excitation, or saturation pulse followed by a CPGM sequence. The time between the saturation pulse and the CPMG sequence, designated as wait time (WT), is varied in the τ (time) domain. This allows for the built up magnetization in the z-axis to be measured. Any number of wait times can be used ranging from a minimum of 2 to a practical limit of about 100; for example, in practice, a minimum of 3 is used. There is no upper limit on how many WTs can be used; however, it is preferred to keep the number lower so that the vertical resolution of the data is kept minimal, battery life is extended or the tool is run on batteries, processing power downhole is usable, and stress on electronics is minimal.

Figure 7:
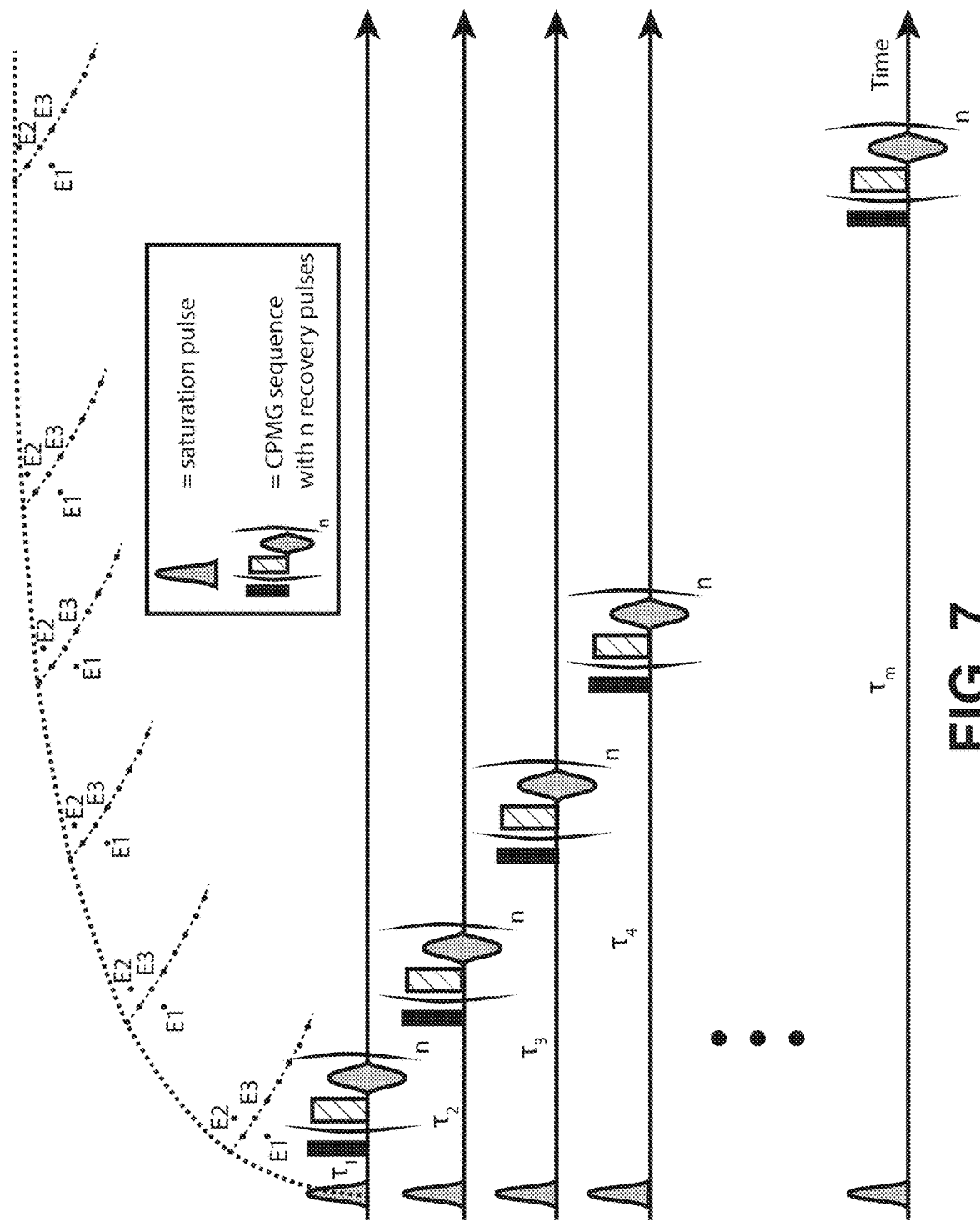
FIG. 7 is a diagram of a $T_1$ experiment.

FIG. 7 is a diagram of a $T_1$ experiment. The individual CPMGs for each WT can have any number of echoes. The WTs in FIG. 7 are as shown as $\tau_1, \tau_2, \ldots, \tau_m$. Commonly, the longest wait time can have a significantly larger number of echoes taken. Lower WTs do not need as many echoes as less magnetization has recovered and the data decays into the noise quickly.

The values in the echo train measurement 625-1, 625-2, ..., 615-8, $Y_{result}$, are shown as solid circles immediately above or below their respective echoes in FIG. 6. The initial values calculated for echo 1 (shown as solid square 630-1) and echo 2 (shown as solid square 630-2) are corrected as indicated by the dashed arrows, to result in echo train measurements 625-1 and 625-2.

The NMR tool acquires echoes based on the pulse sequence used, here this data is designated as S(t). To interpret the data, S(t) is inverted into a different basis: $T_2$ (i.e., transverse relaxation), $T_1$ (i.e., longitudinal recover time), or D (i.e., diffusion). The inversion produces spectrum components which are correlated to a time ($T_1$ or $T_2$) or diffusion axis. The spectrum can then be used to make petro-physical conclusions about the formation. To perform this inversion, the data is fit to known answers.

$$S(t) = \sum_{uvh} x_{uv} \cdot A(T_{1u}, T_{2v}, D_h, t) \quad (1)$$

When the tool is stationary, the signal's known answer, omitting surface/volume interaction, depends on each wait time, diffusion coefficient, gradient, the time of the echo, $T_1$, $T_2$, and the TE. The signal from the tool only occurs with each echo and not a continuum of time and is referred to as y(n). The signal for the nth echo for the kth wait time and for the sth TE has the form:

$$y^{k,s}(n) = \sum_{h=1}^{r}\sum_{v=1}^{q}\sum_{u=1}^{p} x_{hvu} \cdot \left(1 - e^{-\frac{TW_k}{T_{1u}}}\right) \cdot e^{-\frac{t_n}{T_{2v}}} \cdot e^{-\frac{D_h(\gamma \cdot G_b \cdot TE_s)^2 \cdot t_n}{12}} \quad (2)$$

where:
$y^{k,s}(n)$ is the nth echo for the kth wait time for the sth TE,
q is the total number of $T_2$ components,
p is the total number of $T_1$ components,
r is the number of diffusion constants,
n is the count of the echo in a single wait time,
s is the number of the TEs,
$x_{111} \ldots x_{pqr}$ are the amplitudes of the respective spectrum components,
$TW_k$ is the kth wait time,
$T_{21} \ldots T_{2q}$ are the $T_2$ time constants for each of the q factors,
$T_{11} \ldots T_{1p}$ are the $T_1$ time constants for each of the p factors,
$TE_s$ is the sth inter-echo time,
$t_n$ is the time when the nth echo is acquired,
$D_h$ is the hth diffusion constant,
$\gamma$ is the gyromagnetic ratio, and
$G_b$ is the average gradient for a single band b.

While equation (2) includes small assumptions, in practice equation (2) is easier to use if simplified. The exact simplification used may vary based on the parameter targeted. Common simplifications for equation (2) use a ratio between $T_1$ and $T_2$, only a single TE, assume a single Gradient (G), and assume a constant diffusion (D).

$$y^k(n) = \sum_{i=1}^{p} x_i \cdot \left(1 - e^{-\frac{TW_k}{T_{1i}}}\right) \cdot e^{-\frac{n \cdot TE}{T_{2i}}} \cdot e^{-\frac{D(\gamma \cdot G \cdot TE)^2 \cdot n \cdot TE}{12}} \quad (3)$$

where:
$y^k(n)$ is the nth echo for the kth wait time,
p is the total number of $T_1$ components, T1 components are also known as bins,
$x_1 \ldots x_p$ are the amplitudes of the respective spectrum components,
$TW_k$ is the kth wait time,
$T_{11} \ldots T_{1p}$ are the $T_1$ time constants for each of the p factors,
$T_{21} \ldots T_{2p}$ are the $T_2$ time constants for each of the p factors (note that to eliminate the j dimension of the x matrix in equation (1) and thereby simplify equation (2), $T_{2j}$ is assumed to be proportional to $T_{1i}$ so that $T_{2j} \alpha T_{1i}$ for all i and j for a particular wait time $TW_k$ and $T_{2j}$ is renamed $T_{2i}$), TE is the inter-echo time (note that, to simplify equation (2), only one inter-echo time is assumed),
D is the diffusion constant,
$\gamma$ is the gyromagnetic ratio, and
G is the gradient.

Now equation (1) simplifies likewise to:

$$S(t) = \sum_{i} x_i \cdot A(T_{1i}, T_{2i}, t) \quad (1A)$$

The signal can be connoted in many ways. A simple way to handle the data is to form it into a simple vector where one wait time's echoes are followed by the next wait time's echoes. Equation (3) can be used to expand equation (1A) to form a matrix of known results for all wait times and echoes as below:

$$\begin{matrix} TW_1 \\ \\ \\ TW_2 \\ \\ \\ \ldots \\ TW_m \end{matrix} \begin{bmatrix} \begin{bmatrix} y^1(1) \\ y^1(2) \\ \ldots \\ y^1(n_1) \end{bmatrix} \\ \begin{bmatrix} y^2(1) \\ y^2(2) \\ \ldots \\ y^2(n_2) \end{bmatrix} \\ \ldots \\ \begin{bmatrix} y^m(1) \\ y^m(2) \\ \ldots \\ y^m(n_m) \end{bmatrix} \end{bmatrix} = \begin{vmatrix} A^1_{11} & A^1_{21} & \ldots & A^1_{p1} \\ A^1_{12} & A^1_{22} & \ldots & A^1_{p2} \\ \ldots & \ldots & \ldots & \ldots \\ A^1_{1n_1} & A^1_{2n_1} & \ldots & A^1_{pn_1} \\ A^2_{11} & A^2_{21} & \ldots & A^2_{p1} \\ A^2_{12} & A^2_{22} & \ldots & A^2_{p2} \\ \ldots & \ldots & \ldots & \ldots \\ A^2_{1n_2} & A^2_{2n_2} & \ldots & A^2_{pn_2} \\ \ldots & \ldots & \ldots & \ldots \\ A^m_{11} & A^m_{21} & \ldots & A^m_{p1} \\ A^m_{12} & A^m_{22} & \ldots & A^m_{p2} \\ \ldots & \ldots & \ldots & \ldots \\ A^m_{1n_m} & A^m_{2n_m} & \ldots & A^m_{pn_m} \end{vmatrix} \begin{vmatrix} x_1 \\ x_2 \\ \ldots \\ x_p \end{vmatrix} \quad (4)$$

Where
m is the total number of WTs,
$A_{ij}^k = A_{T2\ bin,echo\ number}^{WT\ number}$ is a basis function that can be used to invert the data into the $T_1$ or $T_2$ time domains, and
j is the count of echoes in a sequence of wait times.
For an average gradient and single TE:

$$A_{ij}^k = A_{T2\ bin,\ echo\ number}^{WT\ number} = \left(1 - e^{-\frac{TW_k}{T_{1i}}}\right) \cdot e^{-\frac{j \cdot TE}{T_{2i}}} \cdot e^{-\frac{D(\gamma \cdot G \cdot TE)^2 \cdot n \cdot TE}{12}} \quad (5A)$$

Equation (5A) is a basis function that can be used to invert the data into the $T_1$ or $T_2$ time domain with the coefficients being used as a spectrum in those domains. Other basis functions are possible.

For example, a basis function may only involve $T_2$. In the case where only a single WT is used and only a $T_2$ inversion is being done, a basis function that can be inverted to determine $T_2$ only may be:

$$A_{ij}^k = e^{-\frac{j \cdot TE}{T_{2i}}} \cdot e^{-\frac{D(\gamma \cdot G \cdot TE)^2 \cdot n \cdot TE}{12}} \tag{5B}$$

Further, the basis function is not limited to exponentials. A may be approximated linearly, such as that shown in Equation (5C):

$$A_{ij}^k = \left(1 - \frac{j \cdot TE}{T_{2i}}\right) \cdot e^{-\frac{D(\gamma \cdot G \cdot TE)^2 \cdot j \cdot TE}{12}} \tag{5C}$$

A may be approximated quadratically, such as that shown in Equation (5D):

$$A_{ij}^k = \left(1 - \frac{j \cdot TE}{T_{2i}} - \frac{1}{2}\left(\frac{j \cdot TE}{T_{2i}}\right)^2\right) \cdot e^{-\frac{D(\gamma \cdot G \cdot TE)^2 \cdot j \cdot TE}{12}} \tag{5D}$$

or A may be approximated with a higher order approximation.

In another example there are circumstances where assuming a ratio between $T_1$ and $T_2$ cannot not be used. Such is the case in a circumstance where a $T_1/T_2$ simultaneous inversion for a $T_1/T_2$ map needs to be created. A basis function may created without assumptions about the ratio between $T_1$ and $T_2$ for a $T_1/T_2$ simultaneous inversion for a single TE, such as that shown in equation (5E).

$$A_{uvj}^k = \left(1 - e^{-\frac{TW_k}{T_{1u}}}\right) \cdot e^{-\frac{t_j}{T_{2v}}} \cdot e^{-\frac{D(\gamma \cdot G \cdot TE)^2 \cdot j \cdot TE}{12}} \tag{5E}$$

This basis function has more dimensions than those previously shown and the A basis is now a 3 dimensional matrix. In this circumstance equation (2) is used to expand equation (1) for the inversion.

The above equation (4) can be shortened as:

$$Y = AX \tag{6-1}$$

where:

$$Y = \begin{bmatrix} y^1(1) \\ y^1(2) \\ \ldots \\ y^1(n_1) \\ y^2(1) \\ y^2(2) \\ \ldots \\ y^2(n_2) \\ \ldots \\ y^m(1) \\ y^m(2) \\ \ldots \\ y^m(n_m) \end{bmatrix}, \tag{6-1a}$$

$$A = \begin{bmatrix} A_{11}^1 & A_{21}^1 & \ldots & A_{p1}^1 \\ A_{12}^1 & A_{22}^1 & \ldots & A_{p2}^1 \\ \ldots & \ldots & \ldots & \ldots \\ A_{1n_1}^1 & A_{2n_1}^1 & \ldots & A_{pn_1}^1 \\ A_{11}^2 & A_{21}^2 & \ldots & A_{p1}^2 \\ A_{12}^2 & A_{22}^2 & \ldots & A_{p2}^2 \\ \ldots & \ldots & \ldots & \ldots \\ A_{1n_2}^2 & A_{2n_2}^2 & \ldots & A_{pn_2}^2 \\ \ldots & \ldots & \ldots & \ldots \\ A_{11}^m & A_{21}^m & \ldots & A_{p1}^m \\ A_{12}^m & A_{22}^m & \ldots & A_{p2}^m \\ \ldots & \ldots & \ldots & \ldots \\ A_{1n_m}^m & A_{2n_m}^m & \ldots & A_{pn_m}^m \end{bmatrix}, \tag{6-1b}$$

$$X = \begin{bmatrix} x_1 \\ x_2 \\ x_3 \\ \ldots \\ x_p \end{bmatrix}, \text{ and} \tag{6-1c}$$

The A matrix shown above can be two dimensional or three dimensional. Generally, Y is a vector of echoes taken in a sequence called an "activation." The A matrix is the basis function matrix created to fit the data. And X is the vector of coefficients which minimize the difference between the data and basis function. X is also a vector of coefficients which create the spectrum when plotted against the T1, T2, or D basis axis The spectrum vector X is given by:

$$X = A^{-1}Y \tag{6-2}$$

When the NMR tool is moving at a speed v, the stationary equations above no longer apply. A taking into account the moving speed is A(v). The corresponding Y is Y(v). X remains the same because X is an intrinsic property of the formation. There are many factors in the echo train that can change while in motion. There is the polarization of the $T_1$, captured in a $T_1$ sequence. There is the decay of the echo train captured by a CPMG, or CPMG derived sequence. There are inflicted phases that are similar to a diffusion measurement, captured by doing a diffusion editing like sequence. However, in an adiabatic condition these phases not be observed.

When the tool is in motion, equation (6-1) can be re-written as:

$$Y(v) = A(v)x \tag{7-1}$$

The inversion can be done using the equation (7-1) producing a solution as in equation (7-2):

$$X = A(v)^{-1}Y(v) \tag{7-2}$$

If the inverse of the stationary matrix A is used in equation (7-2), the result is:

$$X^* = A^{-1}Y(v) = A^{-1}A(v)x \tag{7-3}$$

In this method, X is not found directly during the inversion and a correction needs to be done. Since A(v) is different from the stationary A due to $B_0$ inhomogeneity, $A^{-1}A(v)$ is not equal to the unit matrix I, which means that X* is not the same as X In other words, if the stationary matrix A is used with data collected with the NMR tool is moving, an error is created. This is called motion effect.

Consider corrections to X*. The term X* can be corrected by the following equation:

$$X = A(v)^{-1}AX^* \tag{8}$$

where $A(v)^{-1}A$ is called the motion correction matrix.

The term A can be calculated directly. As shown above, constructing the A(v) matrix under non-zero speed is a key to removing motion effect. Correct inversion can be achieved either by using A(v) (motion dependent) in inversion or by using the stationary A and then correcting as in equation (8).

As discussed above, the column vector in A(v), Vector $A_i^k$ (equation 6-1e), is the combined echo trains with all recovery times $TW_1$, $TW_2$, ... and $TW_m$, but the same $T_1$ time constant and $T_2$ time constant for each recovery time. If $B_0$ is known, the A(v) matrix can be calculated either analytically or through simulation. Because A(v) is a function of speed and $T_1/T_2$ values, the combination of a different speed and different $T_1/T_2$ value is big, the amount of computation is huge. One way to reduce computation is to decrease the number of different speeds but interpolate/extrapolate to correct speed. Another technique is to adjust the number of $T_1/T_2$ components (bins).

To calculate A(v) correctly is not a simple matter. A simplification can be made where a simple cylinder shape is considered for the volume. In this case analytical equations can be created for the $T_2$ echo losses in A(v) such as:

$$A(v)=(1-ROP*n*TE)*s(t)$$

With the complex shapes of the magnetic field, the correct A(v) does not have a simple analytical form. One way of creating A(v) more accurately includes procedures to simulate the echo train completely mathematically using the knowledge of $B_0$ and $B_1$. Because this calculation is time consuming, one set of A(v) can be been made using the theoretically perfect $B_0$ and $B_1$, instead of by measuring the field from each real logging tool with a Gauss meter and creating A(v) for each tool.

The magnetic and rf fields can be meshed into small voxels, where each voxel has a $B_0$, $B_1$, and an amount of micro magnetization. A finer mesh provides more accurate echo trains, however, becomes more and more computationally challenging. The tool's response, emf, from any voxel, as in the gridded space of FIG. 10 (discussed below), can be calculated using the principle of reciprocity, as outlined in Hoult, D., 2000, The principle of reciprocity in signal strength calculations—A mathematical guide: Concepts of Magnetic Resonance, 12, (4), 173-187. Then, the micro magnetizations are followed through time using the Bloch equation or rotation matrices. In this way, different A(v) can be found for different ROPs and $T_1$.

$$A(v, T1, ROP) \propto \int\int\int^V \text{micro magnetization}(t, T1, ROP)\, dx\, dy\, dz \qquad (9)$$

Figure 8:
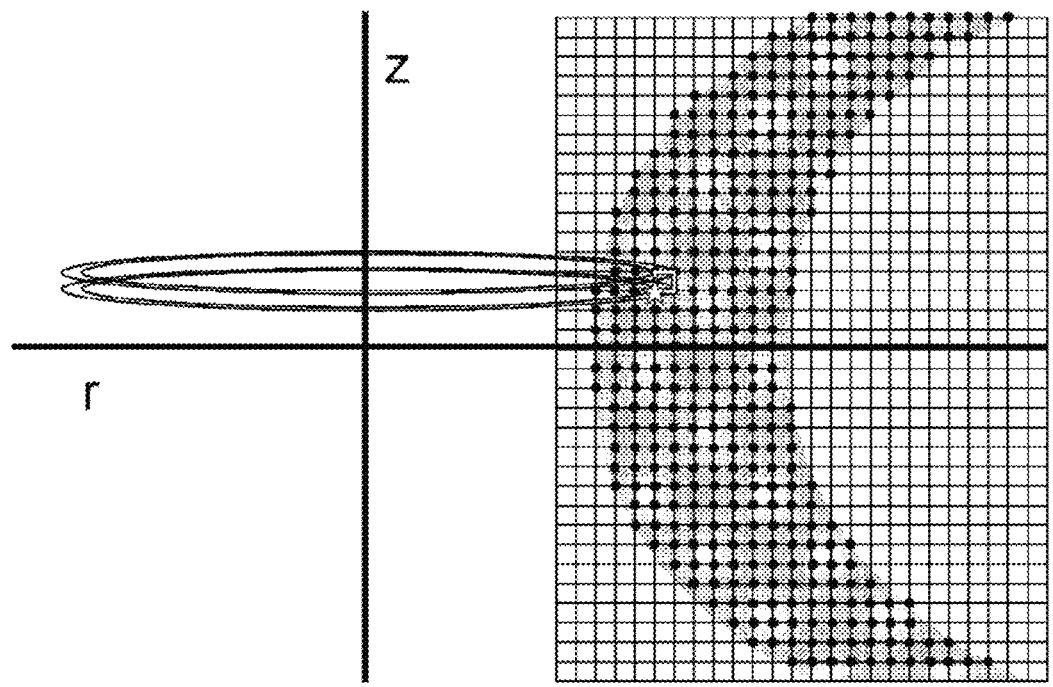
FIG. 8 is a pictorial of a selected sensitive region in a magnetic field.
Figure 9:
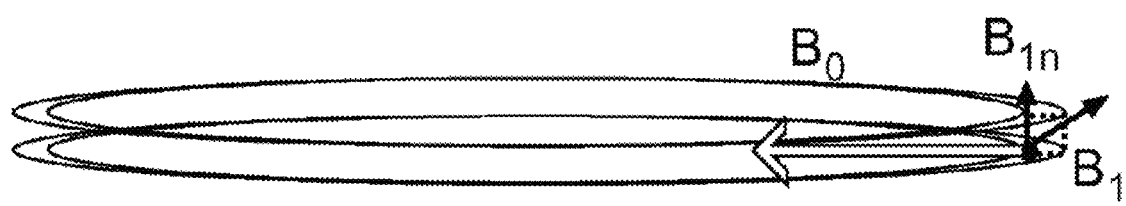
FIG. 9 is a representation of a rotationally symmetric voxel.

FIG. 8 is a pictorial of a selected sensitive region in a magnetic field. This field is split into many voxels. At each voxel a micro magnetization, uses the time dependent $B_1$ and the $B_0$ to calculate a signal for a specific time. That micro magnetization is rotated using excitation and refocusing pulses at specific times to obtain a theoretical echo train. FIG. 9 is a representation of a rotationally symmetric voxel. This allows a simplification in the calculation to go from 3D to 2D using the annulus volume.

Creating the A(v) can be performed using the following steps. First, a zero ROP emf, where the emf is a stimulated signal picked up in the coil which created the $B_1$, is found just as a calibration would be performed on the tool. This allows to rescale the A(v) into the units of porosity instead of in voltage units.

For non-zero ROP calculations, it is simplest to use the tool as a reference frame, that is, as if the tool were stationary and the formation continually moving, however the opposite can also be done. In this case, the magnetization field is moved in relation to the $B_0$ and $B_1$ fields at the ROP. The magnetization, M(t), is a function of speed v, $T_2$ decay, $T_1$ recovery time, $B_0$, and $B_1$. A steady state micro magnetization vector is created for each volume with the micro magnetization aligned with $B_0$. The direction of $B_0$ in each voxel can be designated as: $\hat{z}=[0\ 0\ 1]$. For a motion along the tool, the calculation is in the adiabatic case, and the Barry phase is not an issue. However, if calculating for other motions such as the vibrational plane the Barry phase should be accounted for or smaller voxels and time increments used.

The sensitive volume is then selected from the $B_0$ field using the tool operating frequency and pulse duration or Fourier transformation of a realistic pulse. The saturation/inversion pulse is used to null/invert the magnetization in that sensitive volume. Typically, a saturation/inversion pulse can have a bandwidth between ±3 to ±10% of the tool's operating frequency. It generally will be larger than the excitation pulse's bandwidth. If only a $T_2$ sequence in motion is to be calculated there would be no saturation/inversion pulse.

The micro magnetization is then allowed to recover for a total time equaling the wait time. Recovery occurs in small time increments, $\Delta t$, using the following equation:

$$M_{t_{i+1}}=(M_{t_i}+(\chi B_0-M_{t_i}))(1-e^{-\Delta t/T_1})\hat{z} \qquad (10)$$

where M is the micro magnetization to be integrated over, and $\hat{z}$ is the unit vector in the direction of local z, and $\chi$ is the magnetic susceptibility.

The excitation can be performed with or without considering the pulse width. Without considering the pulse shape and timing, the pulse is computed as an instantaneous event. More complex considerations of the pulse can be done, however, for simplicity only this one is discussed. The excitation pulse can be done with any phase. The refocusing pulse then is best when it is shifted 90° out of phase from the excitation pulse. For example, the excitation pulse could be along the "x" axis, while the refocusing pulse is along the "y" axis. The micro magnetization vector is then rotated using the rotation matrix. For the case of an "x" pulse $$R_x(\theta) = \begin{bmatrix} 1 & 0 & 0 \\ 0 & \cos\theta_{tipE} & -\sin\theta_{tipE} \\ 0 & \sin\theta_{tipE} & \cos\theta_{tipE} \end{bmatrix} \qquad (11)$$

The tipping angle, $\theta_{tipE}$, for each voxel is determined using the strength of $B_1$ perpendicular to $B_0$, $B_{1n}$, at the voxel's location:

$$\theta_{tipE}=\pi\gamma B_{1n}\tau_{excitation} \qquad (12)$$

Where $\gamma$ is the gyromagnetic ratio and $\tau_{excitation}$ is the duration of the excitation pulse.

Following the excitation pulse, the micro magnetization is allowed to precess freely around the static field for ½ TE, where TE is the echo time. From the Bloch equation, it is known that magnetization undergoes a precession under the influence of a magnetic field, which can be simply represented as a rotation:

$$R_z(\theta) = \begin{bmatrix} \cos\theta_{FID} & -\sin\theta_{FID} & 0 \\ \sin\theta_{FID} & \cos\theta_{FID} & 0 \\ 0 & 0 & 1 \end{bmatrix} \quad (13)$$

During this time, the magnetization is still recovering by means of equation (12). So, the rotation also performed in small time increments, $$\theta_{FID} = 2\pi\gamma B_0 \Delta t$$

until a total time of ½ TE has passed.

During the free induction decay (FID), it is easy to assess that magnetization spreads within a couple hundred microseconds to the point where no signal would be measured, making the reason for a recovery pulse obvious.

The first step to recovering the magnetization is to perform a pulse, which will flip the fast and slow spins' phases. Ideally, this would be a 180° pulse; but, as with the excitation pulse, the exact rotation each voxel undergoes will be dependent on the Bin.

$$R_y(\theta) = \begin{bmatrix} \cos\theta_{tipR} & 0 & \sin\theta_{tipR} \\ 0 & 1 & 0 \\ -\sin\theta_{tipR} & 0 & \cos\theta_{tipR} \end{bmatrix} \quad (14)$$

where:

$$\theta_{tipR} = \pi\gamma B_{1n}\tau_{recovery} \quad (14\text{-}1)$$

Where $\tau_{recovery}$ is the duration of the recovery pulse, aka the pulse intended to be a 180° pulse.

This calculation is repeated for all of the wait times in the $T_1$ experiment and for $T_1$ spanning a range of time, for example, between 0.001 s and 10 s, or all the TEs, or all the $T_2$ decays desired to be investigated in the pulse sequence. For very small Tis the motion effect will be minimal. So for $T_1$ between 0.001 s and 0.5 s, for instance, the results of equation 2 or any of its simplifications could be used in place of the model.

The porosity overcall can be correctly accounted for using a more accurate A matrix during inversion processing. Porosity over call is one of the motional effects. There are two ways to gain too much polarization in relation to the stationary measurement. The first is that the movement causes the sensitive region to move out of the "nulled" zone during the saturation/null pulse. Thus, instead of a partial recovery there is part of the volume that has full recovery. The second mechanism by which the porosity can over call is by magnetization which relaxed within a higher magnetic field moved into the sensitive region faster than the magnetization could reach a new equilibrium. These two effects stack onto each other in most cases since the slowest drilling speed is around 40 ft/hr. The A matrix, A(v), can be constructed for a number of different speeds with different Tis. Although this technique requires long computational time for developing the A(v)s, it only requires being performed once. For low-gradient logging tools, the method proves to be very accurate. In tests, data generated had an average overcall of 2 PU (porosity units) attributed to the motion effects on a short aperture. Applications of one or more techniques taught herein may also provide real-time application as data is logged at a well site.

The inversion maybe be done by many methods including singular value decomposition (SVD), regularization, or another inversion method for minimizing the fitting error. Such inversions may be done on the uphole inversion or the downhole inversion.

X coefficients may be interpreted to determine formation characteristics. The term "bin" is mentioned above (see, e.g., Equation (5)). A bin may be the time (either the $T_1$ or $T_2$ time) to which the X coefficient corresponds. For example, using the basis function in Equation (5), $x_1$ corresponds to the $T_{11}$ or $T_{21}$ time. Thus, conventionally, the data to be telemetered to the uphole processing system is the X coefficient (e.g., $x_1$) and the $T_{11}$ or $T_{21}$ time. To conserve telemetry bandwidth between a downhole system and an uphole processing system in an LWD system or a wireline system (if telemetry bandwidth is limited), a system may limit the number of X coefficient of data that may be telemetered between a NMR tool and an uphole processing system to a prescribed number of bins, which may limit the precision of the calculations that can be done by the uphole processing system.

Figure 10:
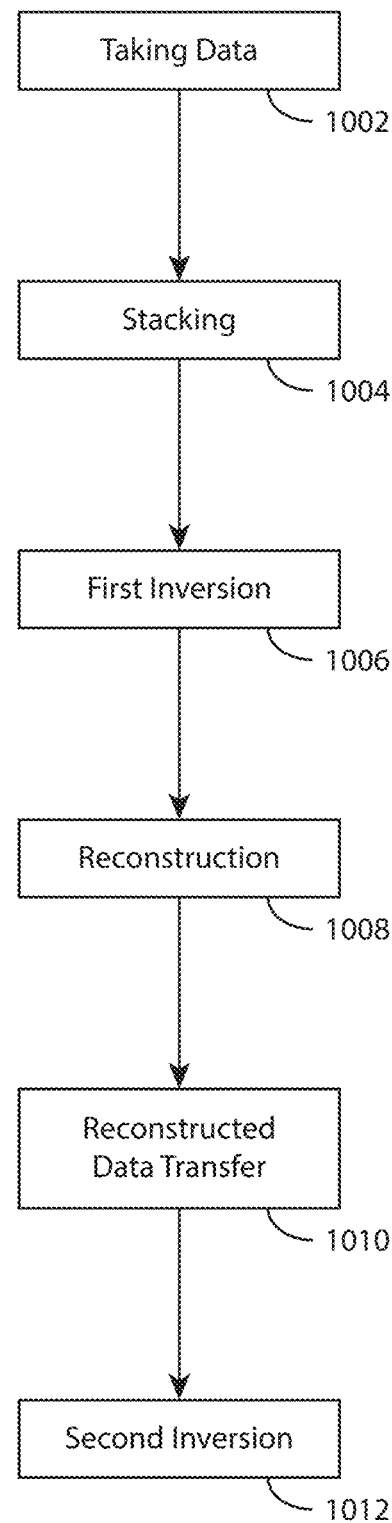
FIG. 10 is a flow chart of a technique for reducing the amount data to be telemetered uphole from an NMR tool, while providing improved quality.

FIG. 10 is a flow chart of a technique for reducing the amount data to be telemetered uphole from an NMR tool, while providing improved quality. A technique for reducing the amount data to be telemetered uphole from an NMR tool, while providing improved quality, may include the following subprocesses, as shown in FIG. 10: taking data 1002, stacking 1004, a first inversion 1004 performed downhole, reconstruction 1008, reconstructed data transfer 1010, and a second inversion 1012 (performed uphole). In this technique, unlike the conventional technique described above, the X coefficient data is not sent uphole unless an inversion is performed that produces a set of X coefficient that fits within the available bandwidth. Instead, A0 and selected echo train data computed at known experimentation times, is transferred, thereby conserving data transfer bandwidth.

In one sub-technique, when the ROP is not known, downhole information can be transferred to the uphole processor via a subset of reconstructed data to perform the ROP-correct second inversion using the A(v) as described above. In another sub-technique, the ROP used to select the A(v) may be observed at the surface, for example by measuring the time and depth of the NMR tool and calculating the rate a drilling string is penetrating a well bore or by observing another parameter at the surface.

Stacking

In the "stacking" subprocess 1002, which is common to all the schemes described below, data collected during specific time windows, such as acquisition windows 620-1, . . . , 620-8 shown in FIG. 6, is combined in some way to time-equivalent data in a subsequent sequence. For example, selected data from the acquisition windows 620-1, . . . , 620-8 shown in FIG. 6 (such as the first point in acquisition window) may be averaged or combined in some other way with the selected data from a subsequent sequence. The stacked data may include a single instance of the echo data where no averaging is done. The stacked data may include the averaging of a phase alternated pair, where the excitation pulse, e.g., excitation pulse 605 in FIG. 6, and recovery pulses, e.g., pulses 610-1, . . . , 610-8 in FIG. 6, use different phases in the subsequent sequence. The stacked data may include many phase alternated pair sequences. The stacked data may average the averages of several phase alternated pair sequences.

First Inversion

The first inversion, which is performed downhole, may be one of the following (specific schemes for carrying out analysis of NMR data is discussed below in connection with FIG. 11; each of these schemes allows for use of one or more of the first inversions described here:

a $T_2$ inversion using equation (5B) as the basis function, a $T_1/T_{2_i}$ inversion using equation (3) (which is the same as equation (2) except that $T_{2j}$ is assumed to be proportional to $T_{1i}$ so that $T_{2j} \alpha T_{1i}$ for all i and j for a particular wait time $TW_k$ and $T_{2j}$ is renamed $T_{2i}$), as the basis function, or a $T_{1_u}/T_{2_v}$ inversion using equation (2).

Data Reconstruction

Generally, data reconstruction starts from the basis function used during the first inversions. The reconstructed data, $Y_{reconstructed}$, just as the original data was, is also a vector containing data at times for each different wait time and desired data point times within that wait time. Each reconstructed data point corresponds to one reconstruction time point in the vector times.

$$Y_{reconstructed} = \begin{bmatrix} y^1(1) \\ y^1(2) \\ \ldots \\ y^1(n_1) \\ y^2(1) \\ y^2(2) \\ \ldots \\ y^2(n_2) \\ \ldots \\ y^m(1) \\ y^m(2) \\ \ldots \\ y^m(n_m) \end{bmatrix},$$

$$\text{times} = t_j^k = \begin{bmatrix} t^1(1) \\ t^1(2) \\ \ldots \\ t^1(n_1) \\ t^2(1) \\ t^2(2) \\ \ldots \\ t^2(n_2) \\ \ldots \\ t^m(1) \\ t^m(2) \\ \ldots \\ t^m(t_m) \end{bmatrix},$$

The elements $y_{j\ reconstructed}^k$ of $Y_{reconstructed}$ are calculated using the basis function that was used during the first inversion, such as equations (15A) and (15B).

$$y_{j_{reconstructed}}^k (t_j^k) = \sum_{i=1}^{p} x_i A_{ij}^k (t_j^k) \tag{15A}$$

$$y_{j_{reconstructed}}^k (t_j^k) = \sum_{u=1}^{q} \sum_{v=1}^{p} x_{uv} A_{uvj}^k (t_{uvj}^k) \tag{15B}$$

Figure 13:
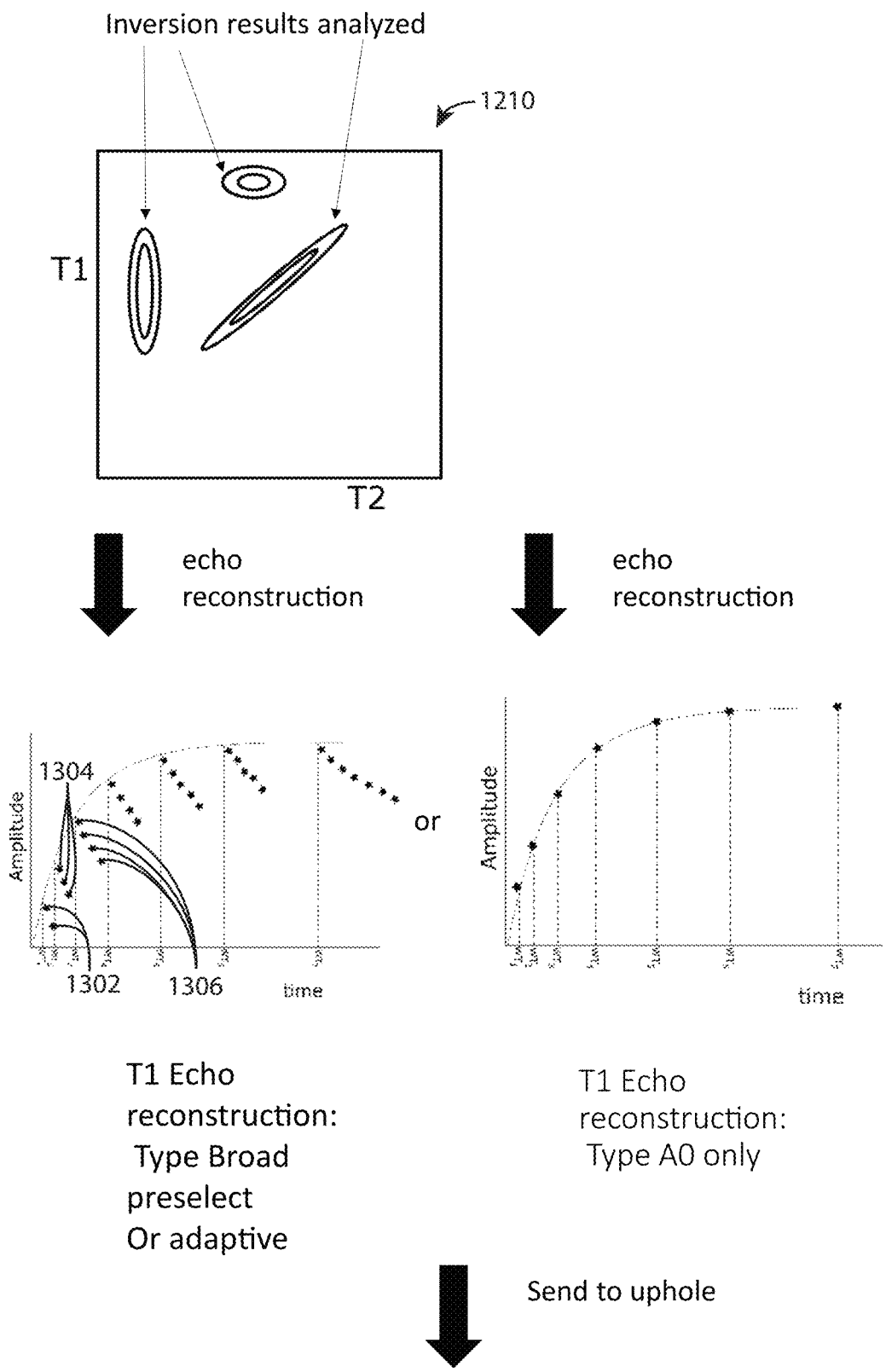
FIG. 13 is a chart illustrating reconstruction of echoes and A0 from inverted T1 data.

The number of points reconstructed for each wait time does not need to be the same, as illustrated in FIG. 13 (e.g., the reconstructed data for $WT_1$ may include 2 points 1302, the reconstructed data for $WT_2$ may include 3 points 1304, the reconstructed data for $WT_3$ may include 4 points 1306, etc.) in the above equation.

One of the most desired points to reconstruct is A0. The original basis function, if not derived from an equation, such as would be the case when using $A_{ik}^k(v)$, might not include an $A_{ij}^k(t=0)$. In this case a correction factor is applied to determine A0. The correction factor may be calculated using the $T_2$ decay:

$$y = e^{-\frac{t}{T_{2i}}} \tag{16}$$

For example, if only the A0 were to be calculated, and only one TE was used, the reconstruction equation would be:

$$y_{j_{reconstructed}}^k (t_j^k = 0) = \frac{\sum_{i=1}^{p} x_i A_{ij}^k (t = TE)}{e^{-\frac{TE}{T_{2i}}}} \tag{17}$$

Assuming $A_{ij}^k$ was created using equation (5A), reconstruction is open to any desired times for each WT, as shown in the following equation (ignoring diffusion effect):

$$y_{j_{reconstructed}}^k (t_j^k) = \sum_{i=1}^{p} x_i \cdot \left(1 - e^{-\frac{TW_k}{T_{1i}}}\right) \cdot e^{-\frac{t_{ij}^k}{T_{2i}}} \tag{18}$$

In one technique, reconstructed $T_1$ data is A0 data for various WTs. A vector of A0 data (i.e., one A0 for each WT, or other times along the WT axis) can be reconstructed using the following equation for elements reconstruction:

$$y_{j_{reconstructed}}^k (t = 0) = \sum_{i=1}^{p} x_i \cdot \left(1 - e^{-\frac{TW_k}{T_{1i}}}\right) \cdot e^{-\frac{0}{T_{2i}}} = \sum_{i=1}^{p} x_i \cdot \left(1 - e^{-\frac{TW_k}{T_{1i}}}\right) \tag{19}$$

In another technique, for example, the reconstructed data could be for the first echo, as in the following equation:

$$y_{j_{reconstructed}}^k (t_j^k = TE) = \sum_{i=1}^{p} x_i \cdot \left(1 - e^{-\frac{TW_k}{T_{1i}}}\right) \cdot e^{-\frac{TE}{T_{2i}}} \tag{20}$$

The reconstructed data may also include A0 along with non-zero times, as in the following equation, which, when evaluated for each k, produces a vector of reconstructed data for each WT:

$$y_{j_{reconstructed}}^k (t_j^k = 0, \text{times} \neq 0) = \sum_{i=1}^{p} x_i \cdot \left(1 - e^{-\frac{TW_k}{T_{1i}}}\right) \cdot e^{-\frac{[t=0,t_k]}{T_{2i}}} \tag{21}$$

where $t_j^k$ are selected times.

Schemes for Implementing the Technique

Figure 11:
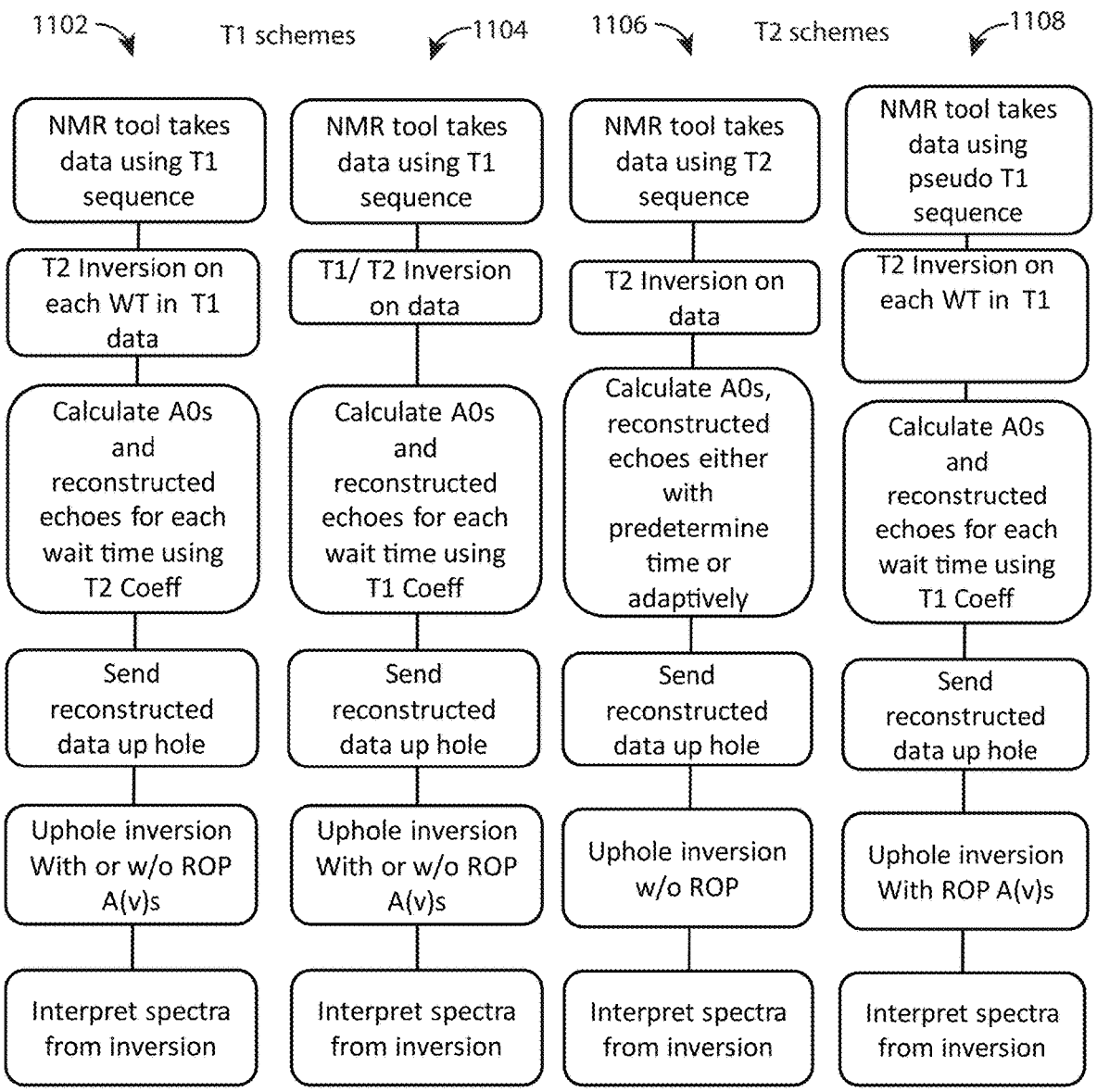
FIG. 11 illustrates four schemes for implementing the technique generally described above.

FIG. 11 illustrates four schemes for implementing the technique generally described above. The four schemes are divided into two sets of schemes, as illustrated in FIG. 11: $T_1$ schemes and $T_2$ schemes.

Figure 12:
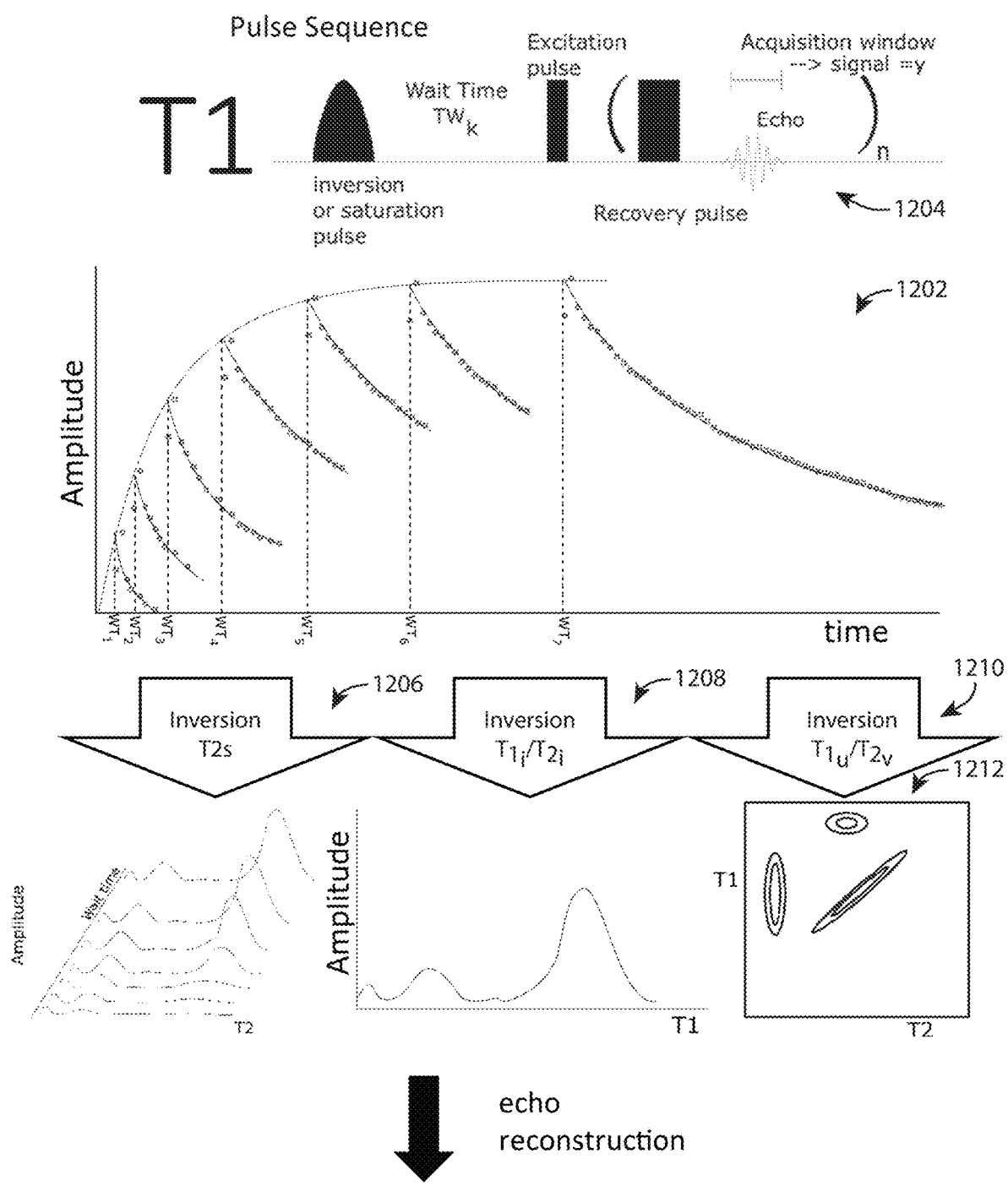
FIG. 12 is a chart illustrating $T_1$ inversions.
Figure 14:
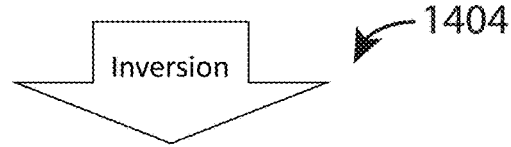
FIG. 14 is a chart illustrating a $T_1$ uphole inversion.
Figure 14:
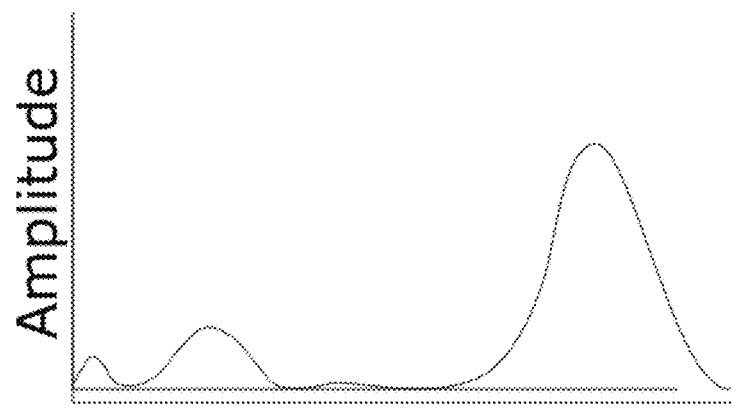
Figure 14:
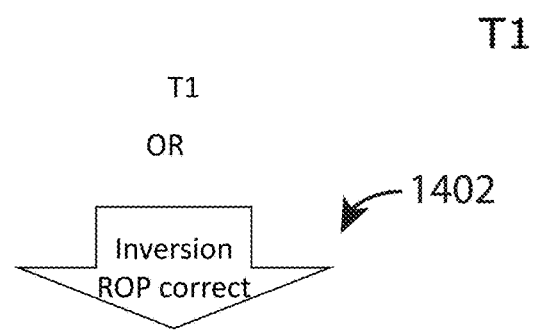
Figure 14:
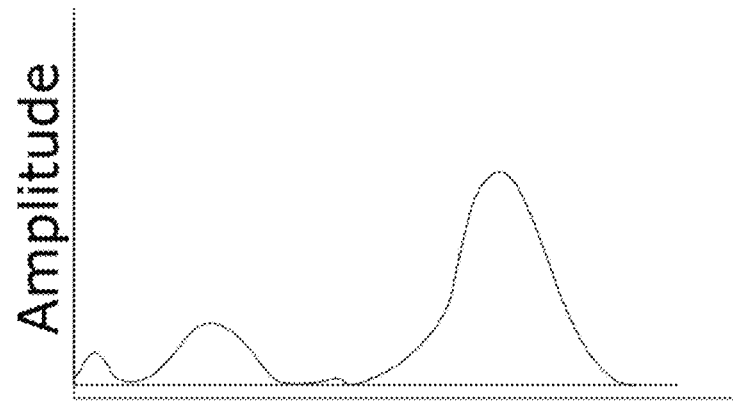
Figure 15:
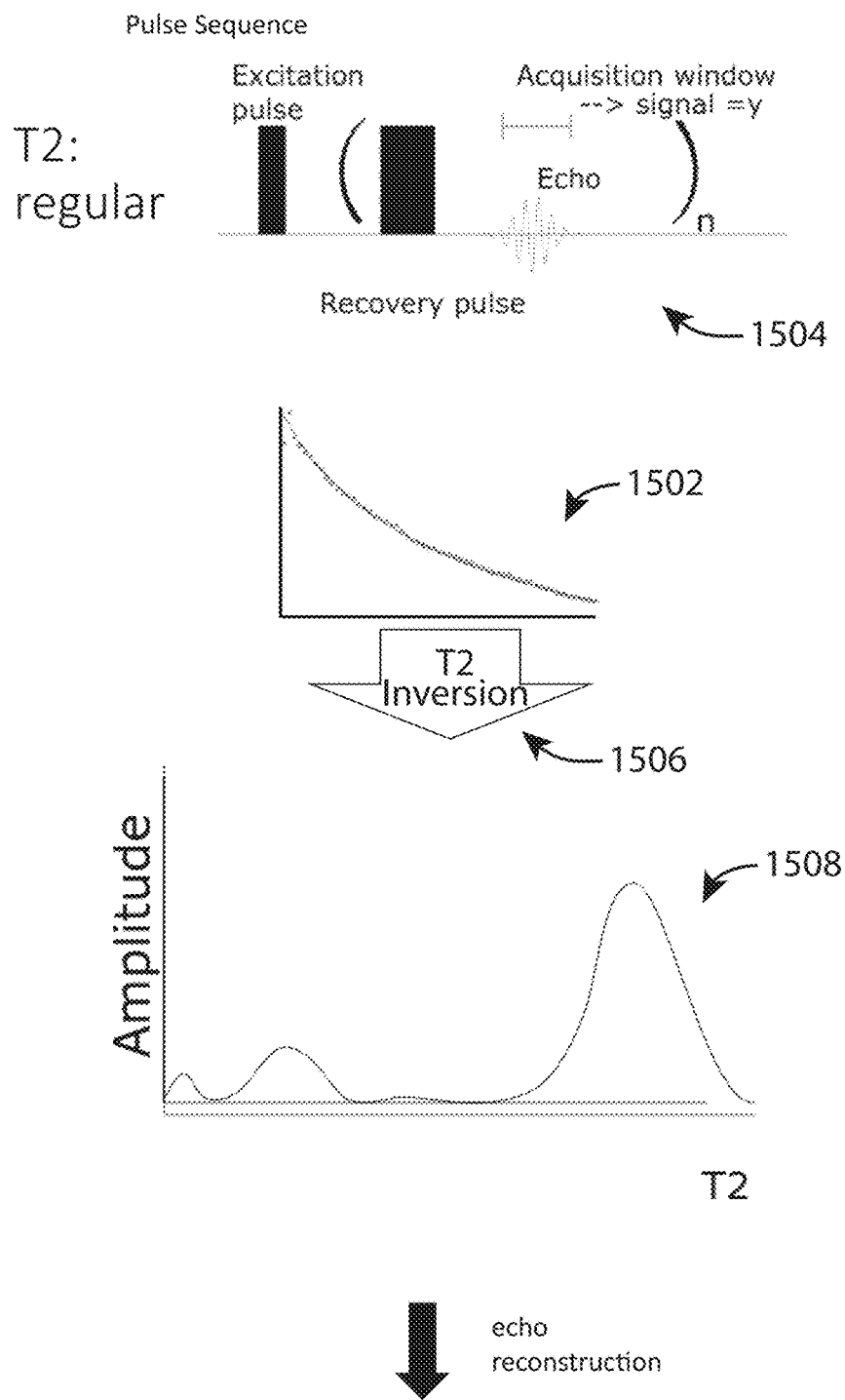
FIG. 15 is a chart illustrating inversion of $T_2$ data.
Figure 16:
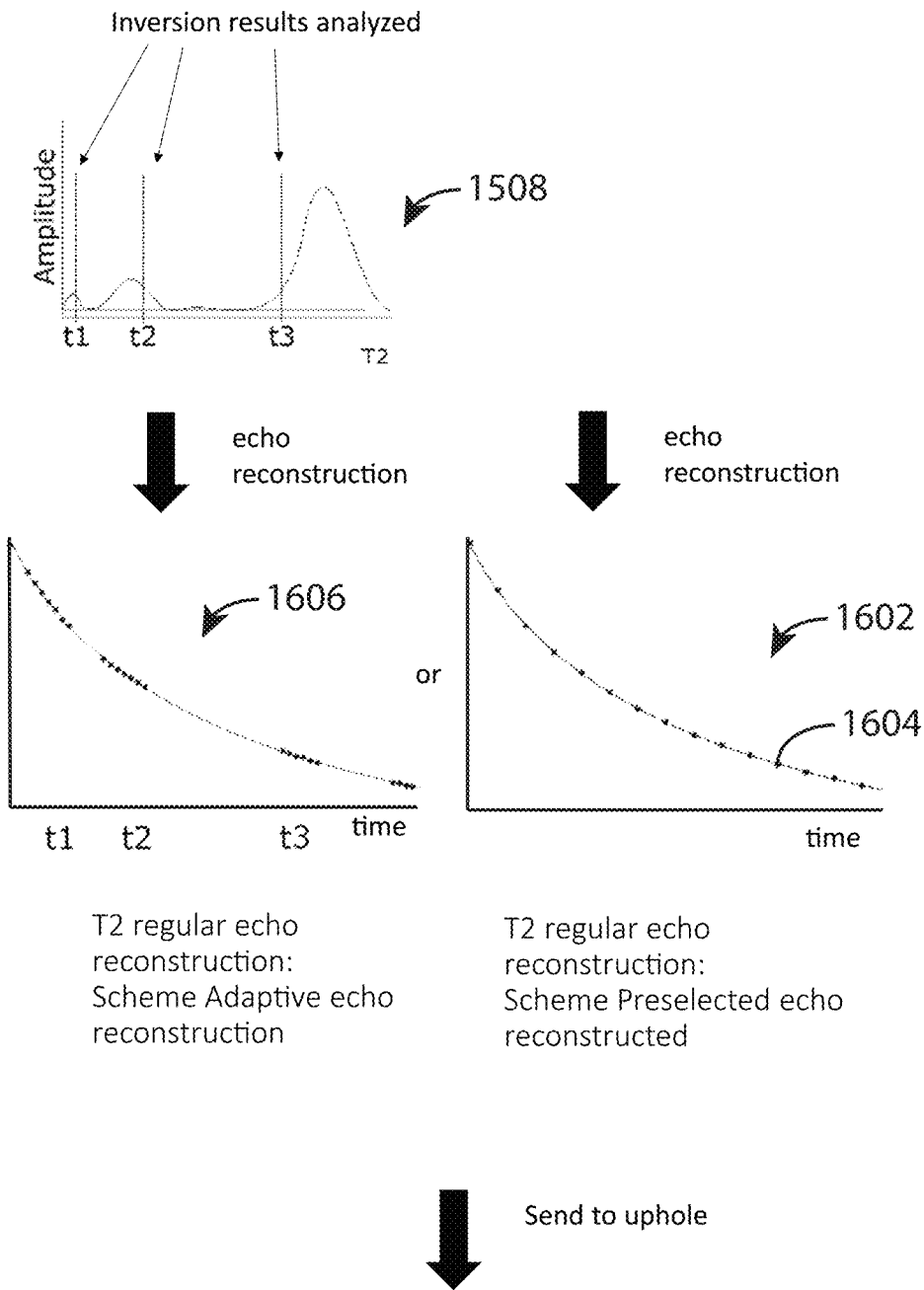
FIG. 16 is a chart illustrating two techniques for reconstructing $T_2$ curves.
Figure 17:
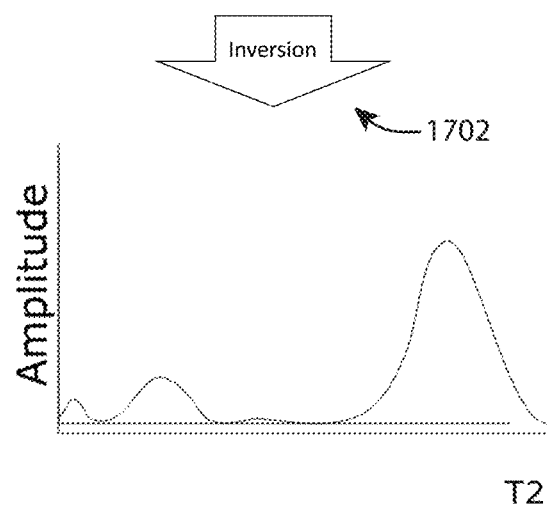
FIG. 17 is a chart illustrating a $T_2$ regular uphole inversion.
Figure 18:
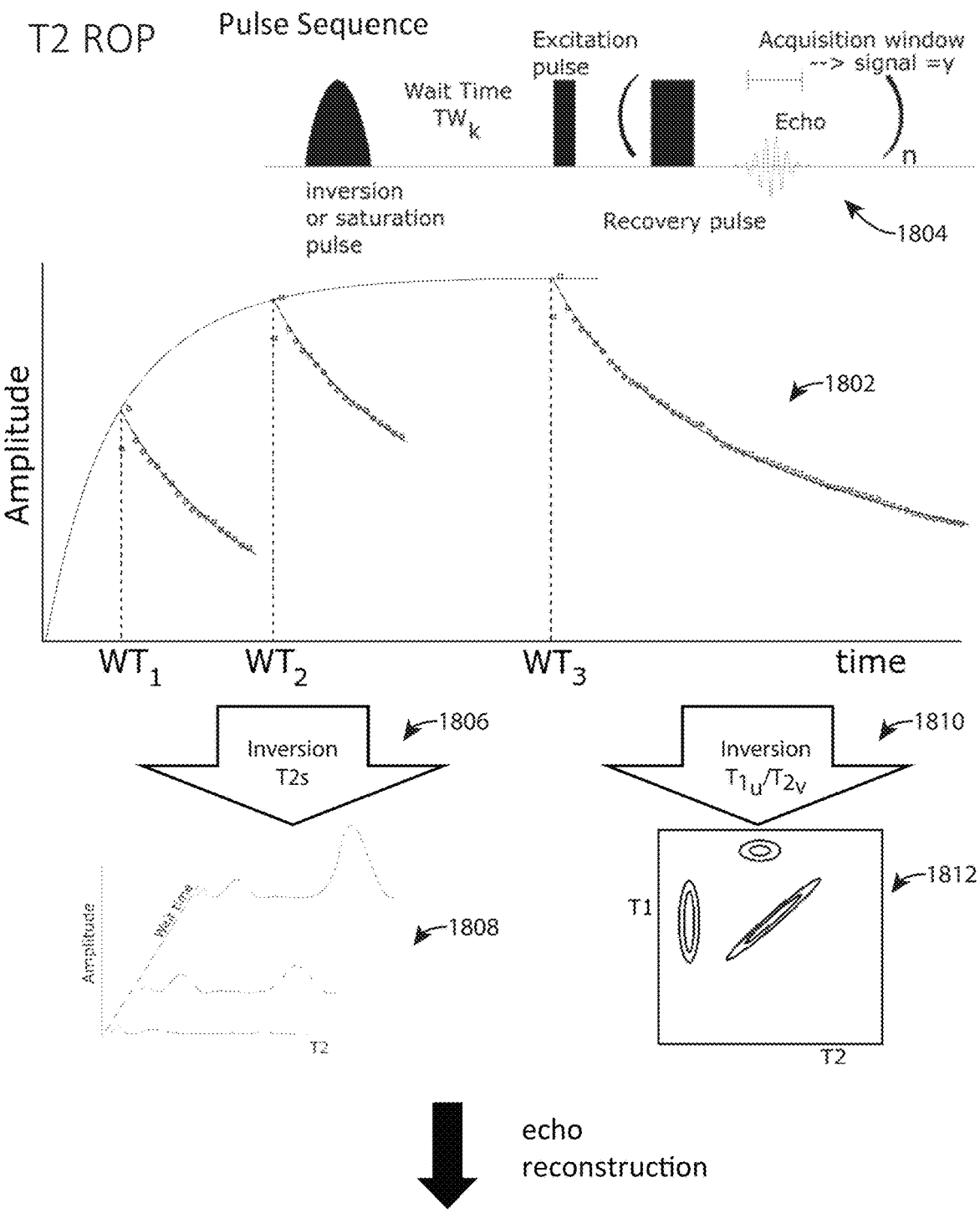
FIG. 18 is a chart illustrating inversions of $T_2$ data in an ROP-corrected scheme.
Figure 19:
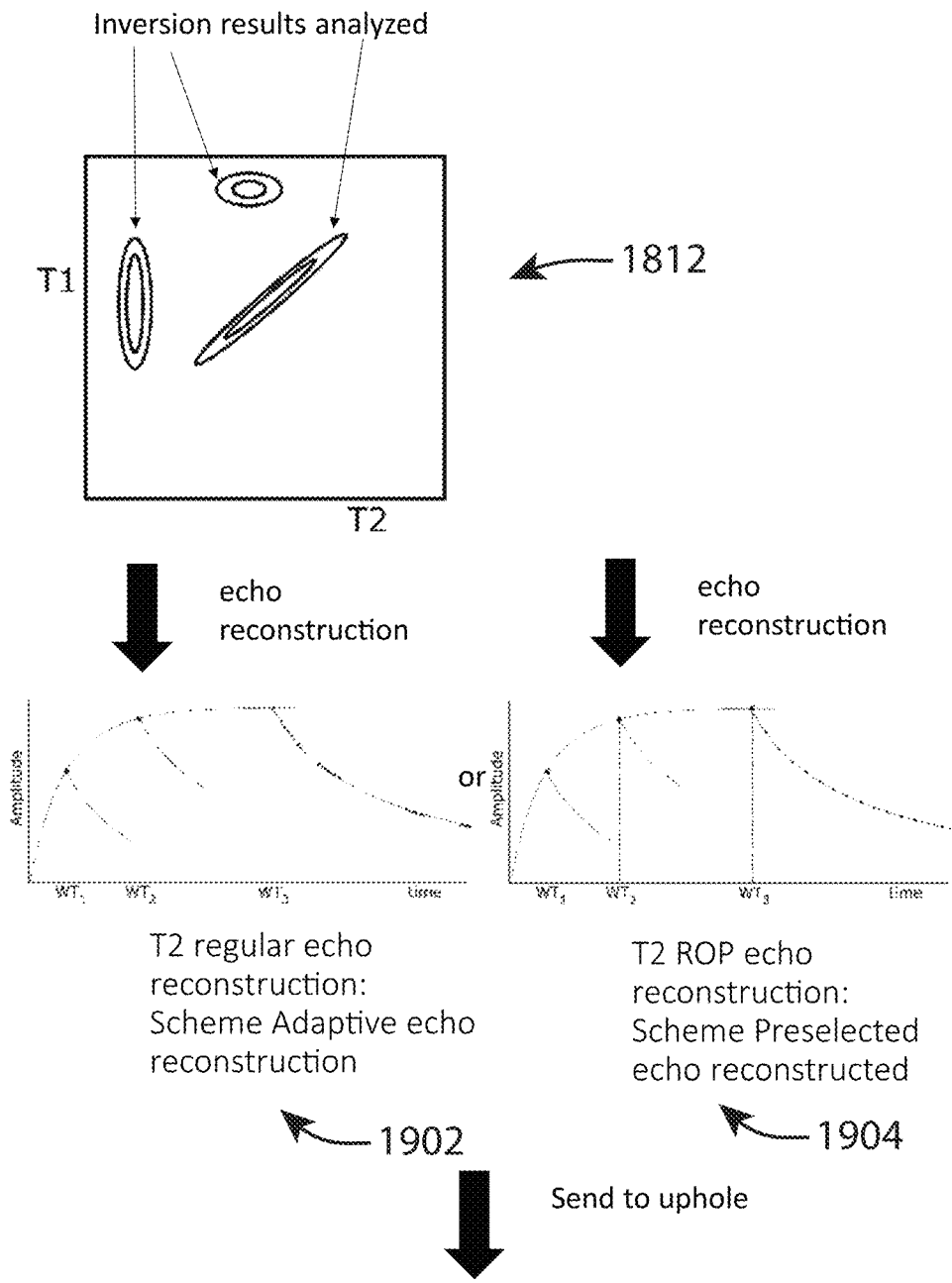
FIG. 19 is a chart illustrating reconstruction of $T_2$ echoes in an ROP-corrected scheme.
Figure 20:
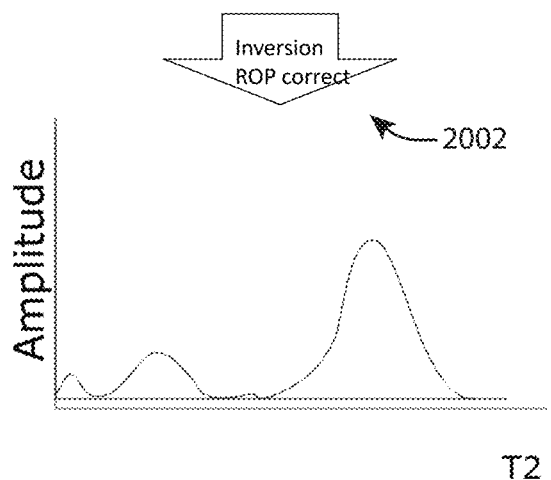
FIG. 20 is a chart illustrating a $T_2$ uphole inversion in an ROP-corrected scheme.

FIGS. 12, 13, and 14 illustrate the $T_1$ schemes. FIG. 12 is a chart illustrating $T_1$ inversions. FIG. 13 is a chart illustrating reconstruction of echoes and A0 from inverted $T_1$ data. FIG. 14 is a chart illustrating a $T_1$ uphole inversion. FIGS. 15-20 illustrate the $T_2$ schemes. FIG. 15 is a chart illustrating inversion of $T_2$ data. FIG. 16 is a chart illustrating two techniques for reconstructing of $T_2$ curves. FIG. 17 is a chart illustrating a $T_2$ regular uphole inversion. FIG. 18 is a chart illustrating inversions of $T_2$ data in an ROP-corrected scheme. FIG. 19 is a chart illustrating reconstruction of $T_2$ echoes in an ROP-corrected scheme. FIG. 20 is a chart illustrating a $T_2$ uphole inversion in an ROP-corrected scheme.

First $T_1$ Scheme (1102)

In a first $T_1$ scheme 1102 (see FIG. 12): The NMR tool takes data 1202 using a $T_1$ sequence 1204. A $T_2$ inversion 1206 is performed on each WT in the $T_1$ data. The $T_2$ inversion determines the $x_i$ coefficients for the data for each wait time by using a basis function such as in equations (5B), (5C), or (5D) to create $A_{ij}^k$.

The A0s are calculated and echoes are reconstructed for each reconstruction wait time using $T_2$ coefficients. For example, equation (5A) may be used to reconstruct the $T_2$ data. The A0 values are the values of the $T_2$ data at time=0 for each wait time.

The reconstructed data is sent uphole.

An uphole inversion (see FIG. 14) is done with (1402) or without (1404) ROP A(v)s. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be to select the $A_{ij}^k(v)$ used in the second inversion.

The spectra are interpreted from the inversion.

Second $T_1$ Scheme (1104)

In a second $T_1$ scheme 1104 (see FIG. 12): The NMR tool takes data 1202 using a $T_1$ sequence 1204. A $T_{1u}/T_{2i}$ inversion 1208 is performed on the data 1202 to determine $x_i$ coefficients of the data by using a basis function such as equation (3). Alternatively, a $T_{1u}/T_{2v}$ inversion 1210 is performed on the data 1202 to determine $x_{ij}$ coefficients of the data by using a basis function such as equation (2). The result of the $T_{1u}/T_{2v}$ inversion 1210 is a "map" 1212 in which, for example, the x axis is the $T_{2v}$ time domain and the y axis is $T_{1u}$ time domain, as shown in FIG. 12. The intensity of the map is the amplitude of the signal at those $T_{uv}$ bin spots. The $A_{uv}^k$ may be calculated on the fly downhole prior to the inversion or they could be preloaded. Further, the basis function for inversion is not limited to that of equation (5A). For instance, the basis function could be that of $A_{uv}^k(v)$ where the v is preselected before the data is taken, is loaded in the memory onto the tool, and is used to reconstruct the echoes.

The A0s are calculated and echoes are reconstructed for each wait time using $T_1$ coefficients, as illustrated in FIG. 13. The reconstructed data is sent uphole.

An uphole inversion (see FIG. 14) is done with 1402 or without 1404 ROP A(v)s. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be to select the $A_{ij}^k(v)$ used in the second inversion.

The spectra is interpreted from the inversion.

First $T_2$ Scheme (1106)

In a first $T_2$ scheme 1106 (see FIG. 15): The NMR tool takes data 1502 using a $T_2$ sequence 1504. A $T_2$ inversion 1506 is performed on the data 1504 to produce results 1508 of the first inversion, i.e., the $x_i$ coefficients.

The A0s are calculated and the echoes are reconstructed either with predetermined times or adaptively. FIG. 16 is a chart illustrating two techniques for reconstructing $T_2$ curves. A $T_2$ curve is reconstructed from the results 1508 of the first inversion 1504 of the stacked $T_2$ data 1506 by selecting the time position of the echoes being reconstructed. While the number of techniques for selecting the time positions is unlimited, there are two general schemes that can be followed. Both schemes can be expressed using equation (18).

In a first reconstruction scheme, represented by curve 1602, the times are preselected and the points 1604 (only one is labeled) are calculated for those preselected times. This scheme is likely to contain the A0 for the echo train. The spacing between echoes could be linear at multiples of TE (the inter-echo time, see FIG. 6). For example, every $4^{th}$ echo of the original train could be recalculated. The scheme could also be non-linear. For example, shorter $T_2$s have a fast drop off so more points may be selected early on and then fewer at later times to account for that.

In a second reconstruction scheme, represented by curve 1606, time positions of the reconstructed echoes are selected adaptively. Typically, the time positions include A0 (i.e., t=0) and a time at the end of the time when the data for the echo was received or from a time far enough out that the reconstructed echoes are unequivocally 0. One adaptive scheme uses concentrations of points, separated by, for example TE, around times where peaks appear in the spectrum created by the coefficients (i.e., times t1, t2, t3 . . . ) in the results of the first inversion 1508, as shown in curve 1606.

The reconstructed data is sent uphole. In the preselected times scheme, the timing information is already known by the uphole processor and is ready to be used for the uphole inversion. As such, only the reconstructed data need be transferred. In contrast, in the adaptive reconstruction scheme, information about the times of the echoes needs to be sent uphole along with the reconstructed data.

FIG. 17 is a chart illustrating a $T_2$ regular uphole inversion. An uphole inversion 1702, shown in FIG. 17, is done on the reconstructed data without ROP correction. When the uphole inversion compensates for a rate-of-penetration (ROP) motion measured on an uphole portion of a drilling system the inversion can include an inversion matrix $A_{ij}(v)$ which has the motion effect calculated as shown above.

The spectra is interpreted from the inversion.

Second $T_2$ Scheme (1108)

FIG. 18 is a chart illustrating inversions of $T_2$ data in an ROP-corrected scheme. FIG. 19 is a chart illustrating reconstruction of $T_2$ echoes in an ROP-corrected scheme. In a second $T_2$ scheme 1108: The NMR tool takes $T_2$ data 1802 using a sequence 1804 with a number of wait times. The number of wait times could be as few as 1 and has no upper limit, but over 25 would be excessive in downhole conditions. FIG. 18 demonstrates a sequence with 3 wait times. The sequence in FIG. 18 has 1 longest wait time with a large number of echoes and 2 shorter wait times with fewer echoes than the one with the longest wait time. The wait times are not limited to be long or short in this sequence, but there is a sequence where all wait times for the $T_2$ ROP corrective scheme are greater than 0.1 seconds.

A $T_2$ inversion 1806, using one of equations (5B), (5C), or (5D), is performed on each WT in the data to produce a $T_2$ inversion result 1808 for each wait time. Alternatively, a $T_1/T_2$ inversion 1810 using, for example, one of equations (5E), is performed on the data to produce a $T_1/T_2$ inversion map 1812.

The A0s are calculated and the echoes are reconstructed for each wait time using $T_2$ coefficients 1808 or the $T_1/T_2$ inversion map 1812. The inversion data is processed to identify the times where the $T_2$ coefficients 1808 or $T_1/T_2$ inversion map 1812 shows the most intensity. The $T_1/T_2$ inversion map 1812 is then reconstructed using, for example, equation (15B), to produce the $T_2$ echo reconstruction 1902, which has greater density at the times where the $T_1/T_2$ inversion map 1810 shows the most intensity. Alternatively, the echo reconstruction 1904 could be produced using the the $T_2$ coefficients 1808 or $T_1/T_2$ inversion map 1812 with for example, equation (15B), and preselected times.

The reconstructed data is sent uphole.

FIG. 20 is a chart illustrating a $T_2$ uphole inversion in an ROP-corrected scheme. An ROP-correct uphole inversion 2002 is performed on the reconstructed data, which is possible because the reconstructed data includes both $T_1$ and $T_2$ data. When the uphole inversion compensates for a rate-of-penetration (ROP) motion measured on an uphole portion of a drilling system the inversion can include an inversion matrix $A_{ij}(v)$ which has the motion effect calculated as shown above. An ROP observed at the surface, for example by measuring the rate a drilling string is proceeding into a well bore or by observing another parameter at the surface, may be used to select the $A_{ij}^{k}(v)$ used in the second inversion.

An ROP observed at the surface, for example by inverting data by an uphole processor to produce the lowest-error $A(v)$, may select the $A_{ij}^{k}(v)$ used in the second inversion.

The resulting data may then be inverted using the lowest-error $A(v)$ to produce the correct spectra.

The spectra is interpreted from the inversion.

In a different embodiment the inversion downhole is done in such a way that there is enough bandwidth to send the inversion results $x_i$ uphole. This may limit the number of spectra results to for example under 20 points. The $x_i$ results are then used to reconstruct the data uphole using equation 15(A) or 15(B). The reconstructed data will undergo a second inversion with an ROP correct A. An ROP observed at the surface, for example by measuring the rate a drilling string is proceeding into a well bore or by observing another parameter at the surface, may be to select the $A_{ij}^{k}(v)$ used in the second inversion.

Operations are described with reference to the systems/apparatus shown in the block diagrams. However, it should be understood that operations could be performed by embodiments of systems and apparatus other than those discussed with reference to the block diagrams, and embodiments discussed with reference to the systems/apparatus could perform operations different than those discussed.

Further examples consistent with the present teachings are set out in the following numbered clauses.

Clause 1. A method comprising:
acquiring echo signals from operation of a nuclear magnetic resonance logging (NMR) tool in a borehole;
performing a multi-inversion process on the echo signals, wherein the multi-inversion process comprises:
a downhole processor performing a downhole inversion,
reconstructing echoes from coefficients in the downhole inversion, wherein reconstructing echoes is performed by one of the downhole processor or an uphole processor,
transmitting one of: (a) the coefficients in the downhole inversion or (b) the reconstructed echoes to the uphole processor, and
the uphole processor performing an uphole inversion on the reconstructed echoes to produce final coefficients used in a spectrum.

Clause 2. The method of clause 1, wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

Clause 3. The method of any preceding clause wherein the reconstructed echoes include A0 data for a plurality of $T_2$ curves.

Clause 4. The method of any preceding clause wherein the uphole inversion compensates for a rate-of-penetration (ROP) motion measured on an uphole portion of a drilling system.

Clause 5. The method of any preceding clause wherein the reconstructed echoes are adjusted to compensate for a rate-of-penetration (ROP) motion measured on an uphole portion of a drilling system.

Clause 6. The method of any preceding clause wherein the downhole inversion uses a non-exponential basis function.

Clause 7. The method of clauses 1-5 wherein the downhole inversion uses an exponential basis function.

Clause 8. The method of any of the preceding clauses wherein reconstructing echoes after the downhole inversion comprises reconstructing echo decay or build up data at preselected times.

Clause 9. The method of clauses 1-7 wherein reconstructing echoes after the downhole inversion comprises reconstructing echoes adaptively.

Clause 10. The method of any of the preceding clauses wherein reconstructing echoes after the downhole inversion comprises reconstructing A0s at a plurality of wait times.

Clause 11. The method of any of the preceding clauses wherein reconstructing echoes after the downhole inversion comprises reconstructing a plurality of points at a plurality of wait times.

Clause 12. A computer program, stored in a non-transitory computer-readable tangible medium, on which is recorded a computer program, the computer program comprising executable instructions, that, when executed, perform a method comprising:
acquiring echo signals from operation of a nuclear magnetic resonance logging (NMR) tool in a borehole;
performing a multi-inversion process on the echo signals, wherein the multi-inversion process comprises:
a downhole processor performing a downhole inversion,
reconstructing echoes from coefficients in the downhole inversion, wherein reconstructing echoes is performed by one of the downhole processor or an uphole processor,
transmitting one of: (a) the coefficients in the downhole inversion or (b) the reconstructed echoes to the uphole processor, and
the uphole processor performing an uphole inversion on the reconstructed echoes to produce final coefficients used in a spectrum.

Clause 13. The method of clause 12 wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

Clause 14. The method of either of clauses 12 or 13 wherein the reconstructed echoes include A0 data for a plurality of $T_2$ curves.

Clause 15. The method of any of clauses 12 or 13 wherein the reconstructed echoes are adjusted to compensate for a rate-of-penetration (ROP) motion measured on an uphole portion of a drilling system.

Clause 16. The method of any of clauses 12-15 wherein the downhole inversion uses one of a non-exponential basis function or an exponential basis function.

Clause 17. The method of any of clauses 12-16 wherein reconstructing echoes after the downhole inversion comprises one of (a) reconstructing echo decay or build up data at preselected times or (b) reconstructing echoes adaptively.

Clause 18. A system comprising:
a nuclear magnetic resonance (NMR) tool;
a control unit coupled to the NMR tool to control the NMR tool; and
a downhole processor coupled to the NMR tool and the control unit to perform operations to:
  acquire echo signals from operation of a nuclear magnetic resonance logging (NMR) tool in a borehole, perform a downhole inversion;
an uphole processor to perform an uphole inversion on reconstructed echoes produced by reconstructing echoes from the coefficients in the downhole inversion to produce final coefficients used in a spectrum;
one of the downhole processor or the uphole processor to reconstruct echoes from coefficients in the downhole inversion to produce the reconstructed echoes; and
the control unit to transmit one of: (a) the coefficients in the downhole inversion or (b) the reconstructed echoes to the uphole processor.

Clause 19. The system of clause 18 wherein the reconstructed echoes are adjusted to compensate for a rate-of-penetration (ROP) motion measured on an uphole portion of a drilling system.

Clause 20. The system of either of clauses 18 or 19 wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
acquiring echo signals from operation of a nuclear magnetic resonance logging (NMR) tool in a borehole; and
performing a multi-inversion process on the acquired echo signals, wherein the multi-inversion process comprises:
  a downhole processor performing a downhole inversion on the acquired echo signals to generate a solution including vector coefficients,
  generating a plurality of reconstructed echoes from the solution, using the vector coefficients generated as part of the solution, the plurality of reconstructed echoes comprising fewer data bits than were included in the acquired echo signals, and wherein generating the reconstructed echoes is performed by one of the downhole processor or an uphole processor,
  transmitting one of: (a) the vector coefficients in the downhole inversion to the uphole processor when generating the reconstructed echoes is performed by the uphole processor or (b) the reconstructed echoes to the uphole processor when generating the reconstructed echoes is performed by the downhole processor, and
  the uphole processor performing an uphole inversion on the reconstructed echoes to produce final coefficients used in a spectrum.

2. The method of claim 1, wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

3. The method of claim 1 wherein the reconstructed echoes include A0 data for a plurality of $T_2$ curves.

4. The method of claim 1, wherein the uphole inversion compensates for a rate-of-penetration (ROP) motion measured on an uphole portion of a drilling system.

5. The method of claim 1 wherein the reconstructed echoes are adjusted to compensate for a rate-of-penetration (ROP) motion measured on an uphole portion of a drilling system.

6. The method of claim 1 wherein the downhole inversion uses a non-exponential basis function.

7. The method of claim 1 wherein the downhole inversion uses an exponential basis function.

8. The method of claim 1 wherein reconstructing echoes after the downhole inversion comprises reconstructing echo decay or build up data at preselected times.

9. The method of claim 1 wherein reconstructing echoes after the downhole inversion comprises reconstructing echoes adaptively.

10. The method of claim 1 wherein reconstructing echoes after the downhole inversion comprises reconstructing A0s at a plurality of wait times.

11. The method of claim 1 wherein reconstructing echoes after the downhole inversion comprises reconstructing a plurality of points at a plurality of wait times.

12. A computer program, stored in a non-transitory computer-readable tangible medium, on which is recorded a computer program, the computer program comprising executable instructions, that, when executed, perform a method comprising:

acquiring echo signals from operation of a nuclear magnetic resonance logging (NMR) tool in a borehole; and performing a multi-inversion process on the echo signals, wherein the multi-inversion process comprises:

a downhole processor performing a downhole inversion on the acquired echo signals to generate a solution including vector coefficients, generating a plurality of reconstructed echoes from the solution, using the vector coefficients generated as part of the solution, the plurality of reconstructed echoes comprising fewer data bits than were included in the acquired echo signals, and wherein generating the reconstructed echoes is performed by one of the downhole processor or an uphole processor, transmitting one of: (a) the vector coefficients in the downhole inversion to the uphole processor when generating the reconstructed echoes is performed by the uphole processor or (b) the reconstructed echoes to the uphole processor when generating the reconstructed echoes is performed by the downhole processor, and the uphole processor performing an uphole inversion on the reconstructed echoes to produce final coefficients used in a spectrum.

13. The method of claim 12 wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

14. The method of claim 12 wherein the reconstructed echoes include A0 data for a plurality of $T_2$ curves.

15. The method of claim 12 wherein the reconstructed echoes are adjusted to compensate for a rate-of-penetration (ROP) motion measured on an uphole portion of a drilling system.

16. The method of claim 12 wherein the downhole inversion uses one of a non-exponential basis function or an exponential basis function.

17. The method of claim 12 wherein reconstructing echoes after the downhole inversion comprises one of (a) reconstructing echo decay or build up data at preselected times or (b) reconstructing echoes adaptively.

18. A system comprising:

a nuclear magnetic resonance (NMR) tool;

a control unit coupled to the NMR tool to control the NMR tool; and a downhole processor coupled to the NMR tool and the control unit to perform operations to:

acquire echo signals from operation of a nuclear magnetic resonance logging (NMR) tool in a borehole, perform a downhole inversion on the acquired echo signals to generate a solution including vector coefficients, wherein the inversion process comprises generating a plurality of reconstructed echoes from the solution using the vector coefficients generated as part of the solution, the plurality of reconstructed echoes comprising fewer data bits than were included in the acquired echo signals;

an uphole processor to perform an uphole inversion on reconstructed echoes produced by reconstructing echoes from vector coefficients in the downhole inversion to produce final coefficients used in a spectrum;

one of the downhole processor or the uphole processor to reconstruct echoes from vector coefficients in the downhole inversion to produce the reconstructed echoes; and the control unit to transmit one of: (a) the vector coefficients in the downhole inversion to the uphole processor when generating the reconstructed echoes is performed by the uphole processor or (b) the reconstructed echoes to the uphole processor when generating the reconstructed echoes is performed by the downhole processor.

19. The system of claim 18 wherein the reconstructed echoes are adjusted to compensate for a rate-of-penetration (ROP) motion measured on an uphole portion of a drilling system.

20. The system of claim 18 wherein the downhole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion, and wherein the uphole inversion is one of a singular value decomposition, regularization, or a fitting error inversion method and includes one of a $T_2$ inversion, a $T_1/T_2$ inversion where $T_1$ and $T_2$ are related by a ratio, a $T_1$-$T_2$ map inversion.

* * * * *